(12) United States Patent  
Yan et al.

(10) Patent No.: US 9,270,188 B2
(45) Date of Patent: Feb. 23, 2016

(54) DC-DC CONVERTER AND SWITCHING METHOD FOR THE SAME

(71) Applicant: DELTA ELECTRONICS, INC., Taoyuan Hsien (TW)

(72) Inventors: Chao Yan, Taoyuan Hsien (TW); Mi Chen, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 225 days.

(21) Appl. No.: 14/056,965

(22) Filed: Oct. 18, 2013

(65) Prior Publication Data

US 2014/0146573 A1    May 29, 2014

(30) Foreign Application Priority Data

Nov. 27, 2012  (CN) .......................... 2013 1 0152199

(51) Int. Cl.
*H02M 3/335* (2006.01)
*H02M 3/337* (2006.01)
*H02M 1/00* (2007.01)

(52) U.S. Cl.
CPC ........ *H02M 3/33569* (2013.01); *H02M 3/3376* (2013.01); *H02M 3/33507* (2013.01); *H02M 2001/0058* (2013.01); *Y02B 70/1491* (2013.01)

(58) Field of Classification Search
CPC ...................... H02M 3/33507; H02M 3/33569
USPC .................................................. 363/17, 21.02
See application file for complete search history.

(56) References Cited

U.S. PATENT DOCUMENTS

| | | | |
|---|---|---|---|
| 8,295,068 B2* | 10/2012 | Lai et al. | 363/98 |
| 8,363,434 B2* | 1/2013 | Lin | 363/44 |
| 8,405,367 B2* | 3/2013 | Chisenga et al. | 323/207 |
| 2006/0221648 A1* | 10/2006 | Liu | 363/17 |
| 2008/0137385 A1* | 6/2008 | Kang | 363/132 |
| 2009/0244934 A1* | 10/2009 | Wang et al. | 363/21.06 |
| 2012/0120683 A1* | 5/2012 | Hua et al. | 363/17 |

* cited by examiner

*Primary Examiner* — Timothy J Dole
*Assistant Examiner* — Ishrat Jamali
(74) *Attorney, Agent, or Firm* — CKC & Partners Co., Ltd.

(57) ABSTRACT

Disclosed herein is a direct current to direct current (DC-DC) converter. The DC-DC converter includes a first bridge and a second bridge. The first bridge includes a first switch and a second switch, whereas the second bridge includes a third switch and a fourth switch. The second bridge is in parallel connection with the first bridge. The second switch is in series connection with the first switch, and the fourth switch is in series connection with the third switch. The DC-DC converter switches between a first mode and a second mode based on a detection signal. Further, a method for controlling the DC-DC converter is also disclosed herein.

24 Claims, 16 Drawing Sheets

When the DC-DC conversion module is operated in the first mode, controlling the first switch and the third switch, such that there is a first overlapping time between the turn-on period of the first switch and the turn-on period of the third switch; and controlling the second switch and the fourth switch, such that there is a second overlapping time between the turn-on period of the second switch and the turn-on period of the forth switch ~1510

When the DC-DC conversion module is operated in the second mode, controlling the first switch and the third switch, such that there is an idle time between the turn-on period of the first switch Q1 and the turn-on period of the third switch; and controlling the second switch and the fourth switch, such that there is an idle time between the turn-on period of the second switch and the turn-on period of the forth switch ~1520

When the duty ratio of the DC-DC conversion module is greater than 70%, controlling the DC-DC conversion module to operate in the first mode ~1530

When the duty ratio of the DC-DC conversion module is less than 70%, controlling the DC-DC conversion module to operate in the second mode ~1540

DC-DC CONVERTER AND SWITCHING METHOD FOR THE SAME

RELATED APPLICATIONS

This application claims priority to China Application Serial Number 201310152199.5, filed Nov. 27, 2012, which is herein incorporated by reference.

BACKGROUND

1. Field of Invention

The embodiment of the present invention relates generally to a converter and method for controlling the same, and more particular, to a direct current to direct current (DC-DC) converter and method for controlling the same.

2. Description of Related Art

With the developments of science and technology, the range of the output voltage of power-supplying electronic products is becoming wider. For example, electric automobile charging stations are used to provide electric power to various types of electric automobile in which batteries of these various types of electric automobiles may require different rated voltages. Therefore, the electric automobile charging stations have to provide a wide range of output voltages so as to meet the requirements of the various types of electric automobiles.

The full bridge zero-voltage switch (ZVS) converter, such as, phase-shifted full bridge converter and complementary full bridge converter, has the characteristics of wide output-voltage range which satisfies the industry's requirement for the power-supplying electronic products. For a full bridge zero-voltage switch converter under the same output current, the efficiencies of the converter under high-voltage output and low-voltage output are compared. The results indicates that when the effective duty ratio is greater, the output voltage of the full bridge zero-voltage switch converter is higher, thereby the converter can accomplish the zero-voltage turn-on, and the efficiency of the converter is also higher. Whereas when the output voltage of the full bridge zero-voltage switch converter is lower, the effective duty ratio thereof is smaller. Under this circumstance, since the switch frequency remains constant, the switch loss is almost the same as that under the high-voltage output.

However, because of the resonant inductor flow current, the loop-current is present inside the full bridge zero-voltage switch converter for a long time, and hence the conduction losses under low-voltage output and the high-voltage output are almost the same. Therefore, when the output current is constant, the power under low-voltage output is smaller, which leads to a relatively greater loss. As a result, under low-voltage output, the efficiency of the full bridge zero-voltage switch converter is greatly decreased.

Many efforts have been devoted trying to find a solution of the aforementioned problems. Nonetheless, there still a need to improve the existing apparatus and techniques in the art.

SUMMARY

One aspect of the present invention is directed to a DC-DC converter. The DC-DC converter comprises a first bridge and a second bridge, and the second bridge is in parallel connection with the first bridge. The first bridge comprises a first switch and a second switch; the first switch has a first end and a second end, and the second switch has a first end and a second end; the first end of the second switch is in series connection with the second end of the first switch. The second bridge comprises a third switch and a fourth switch; the third switch has a first end and a second end, and the first end of the third switch is electrically connected to the first end of the first switch; the fourth switch has a first end and a second end, the first end of the fourth switch is in series connection with the second end of the third switch, and the second end of the fourth switch is electrically connected to the second end of the second switch. The DC-DC converter is operated in a first mode or a second mode, and the DC-DC converter is switched between the first mode and the second mode based on a detection signal.

Another aspect of the present invention is directed to a control method for using in a DC-DC converter. The DC-DC converter comprises a first bridge and a second bridge that are in parallel connection; the first bridge comprises a first switch and a second switch that are in series connection; and the second bridge comprises a third switch and a fourth switch that are in series connection. The control method comprises the following steps:

detecting an electrical parameter which reflects the efficiency of the DC-DC converter; and switching the DC-DC converter between a first mode and a second mode based on the detected electrical parameter.

Another aspect of the present disclosure is directed to a DC-DC conversion system for optimizing the efficiency within a full output voltage range. The DC-DC converter comprises a DC-DC converter and a control circuit. The DC-DC converter comprises a first bridge and a second bridge, in which the second bridge is in parallel connection with the first bridge. The first bridge comprises a first switch and a second switch, in which the first switch has a first end and a second end, and the second switch has a first end and a second end, wherein the second switch is in series connection with the second end of the first switch. The second bridge comprises a third switch and a fourth switch, in which the third switch has a first end and a second end, wherein the first end of the third switch is electrically connected to the first end of the first switch; and a fourth switch has a first end and a second end, wherein the fourth switch is in series connection with the second end of the third switch, and the second end of the fourth switch is electrically connected to the second end of the second switch. The control circuit comprises a signal generation unit and a control unit. The signal generation unit is configured to receive at least one electrical parameter reflecting the efficiency of the DC-DC converter, and output a corresponding switch signal. The control unit is configured to output a corresponding control signal to the DC-DC converter based on the switch signal.

In sum, according to the technical content of the present invention, embodiments of the present invention provide a DC-DC converter and method for controlling the same so as to solve the problem associated with the substantial decrease of the efficiency of the full bridge zero-voltage switch converter under low-voltage output. Also, the embodiments are operable to maintain the full bridge zero-voltage switch converter in the phase-shifted full bridge converter mode or the complementary full bridge converter mode under high-voltage output.

Further, in the DC-DC converter, because of the present method for controlling the DC-DC converter, the driving signal provided to the DC-DC converter is gradually adjusted, thereby avoiding the abrupt alteration of the waveform, which increases the stability of the DC-DC converter.

BRIEF DESCRIPTION OF THE DRAWINGS

The invention can be more fully understood by reading the following detailed description of the embodiments, with reference to the accompanying drawings as follows:

FIG. 15 is a flow diagram schematically illustrating the method for controlling a DC-DC converter according to yet another embodiment of the present invention.

DETAILED DESCRIPTION

Figure 1:
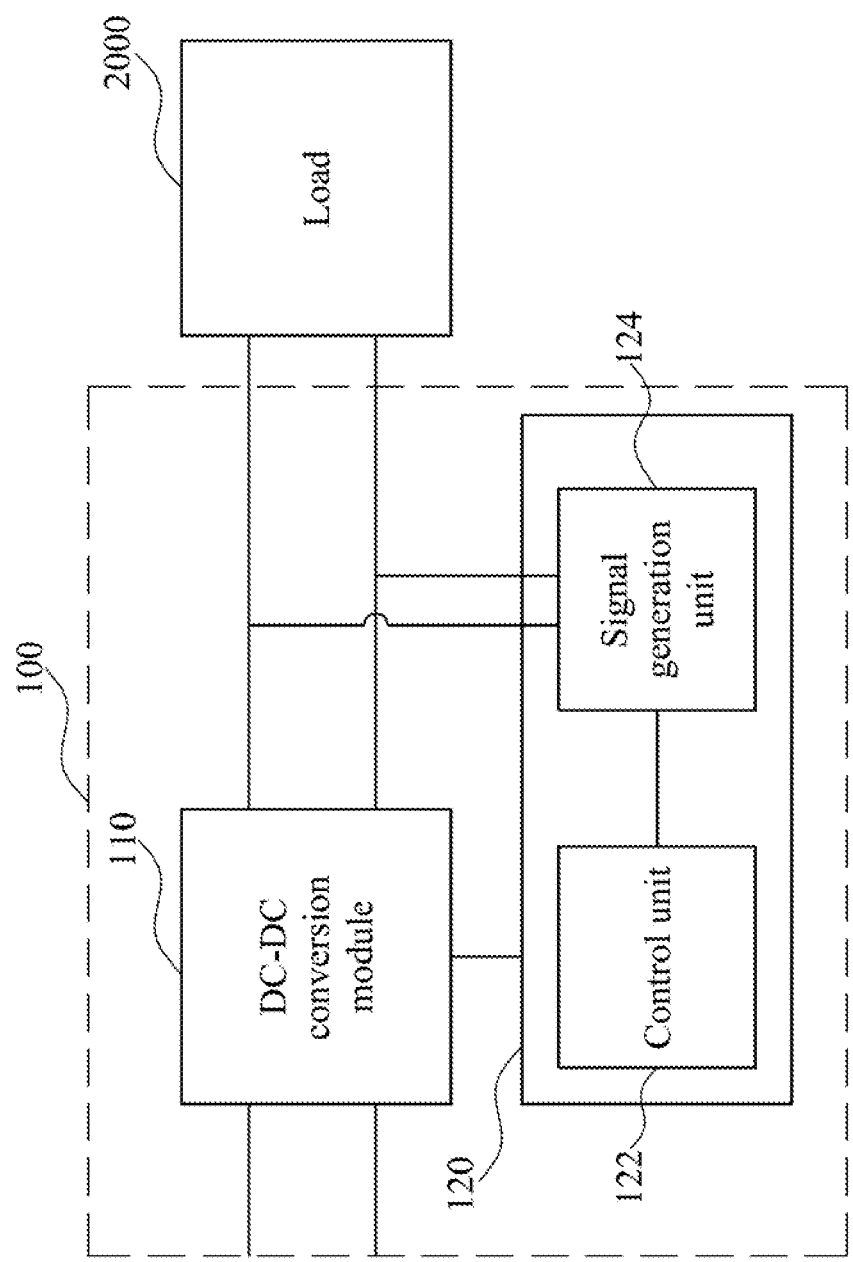
FIG. 1 is a circuit block diagram illustrating a DC-DC converter according to one embodiment of the present invention.

The detailed description provided below is in connection with the appended drawings and various embodiments. Like reference numerals and designations in the various drawings are used to indicate like elements/parts. However, these embodiments are not intended to limit the scope of the present invention. The description sets forth the functions of the example and the sequence of steps for constructing and operating the example. However, the same or equivalent functions and sequences may be accomplished by different examples.

The drawings are provided for illustrative purposes, and are not drawn to scale. Also, well-known elements and steps are not illustrated in the embodiments so as to avoid unnecessary limitation to the present invention.

Further, the phrases "coupled to" and "connected to" are used herein to describe the physical or electrical contact between two or more elements, either directly or indirectly. Also, these phrases also apply to the mutual operation or action between two or more elements.

FIG. 1 is a circuit block diagram of a DC-DC converter according to one embodiment of the present invention. As illustrated, the DC-DC converter 100 comprises a DC-DC conversion module 110 and a control module 120. The DC-DC conversion module 110 is configured to receive a DC input, and process the input to provide a wide-range output DC voltage to the load 2000. The front end of the DC-DC conversion module 110 may further comprises an alternating current to direct current (AC-DC) conversion circuit, which may be, but is not limited to, a simple rectifying circuit, single-phase power factor correction (PFC) circuit or a three-phase PFC circuit. The AC-DC conversion circuit converts the alternating current to a stable direct current, which is then provided to the DC-DC converter of the DC-DC conversion module 110.

Further, the control module 120 receives a feedback detection signal. For example, said detection signal is the duty ratio, output current or output voltage of the DC-DC conversion module 110, which is capable of reflecting the efficiency of the DC-DC converter 100. The control module 120 switches between a first mode and a second mode based on the detection signal. In this infrastructure, the control module 120 could be integrated in the DC-DC conversion module 110, or independent from the DC-DC conversion module 110, depending on the actual need and is not limited to the infrastructure depicted in FIG. 1.

In one embodiment of the present invention, the control module 120 comprises a control unit 122 and a signal generation unit 124. The signal generation unit 124 is configured to receive an electrical parameter capable of reflecting the efficiency of the DC-DC conversion module 110, and output a corresponding switch signal; whereas the control unit 122 is configured to output a corresponding control signal to the DC-DC conversion module 110 based on the switch signal. For example, when the switch signal is a high-level voltage, the DC-DC conversion module 110 is operated in a first mode; and when the switch signal is a low-level voltage, the DC-DC conversion module 110 is operated in a second mode. The technical terms of "a first mode" and "a second mode" are described in detailed hereinafter.

Figure 2:
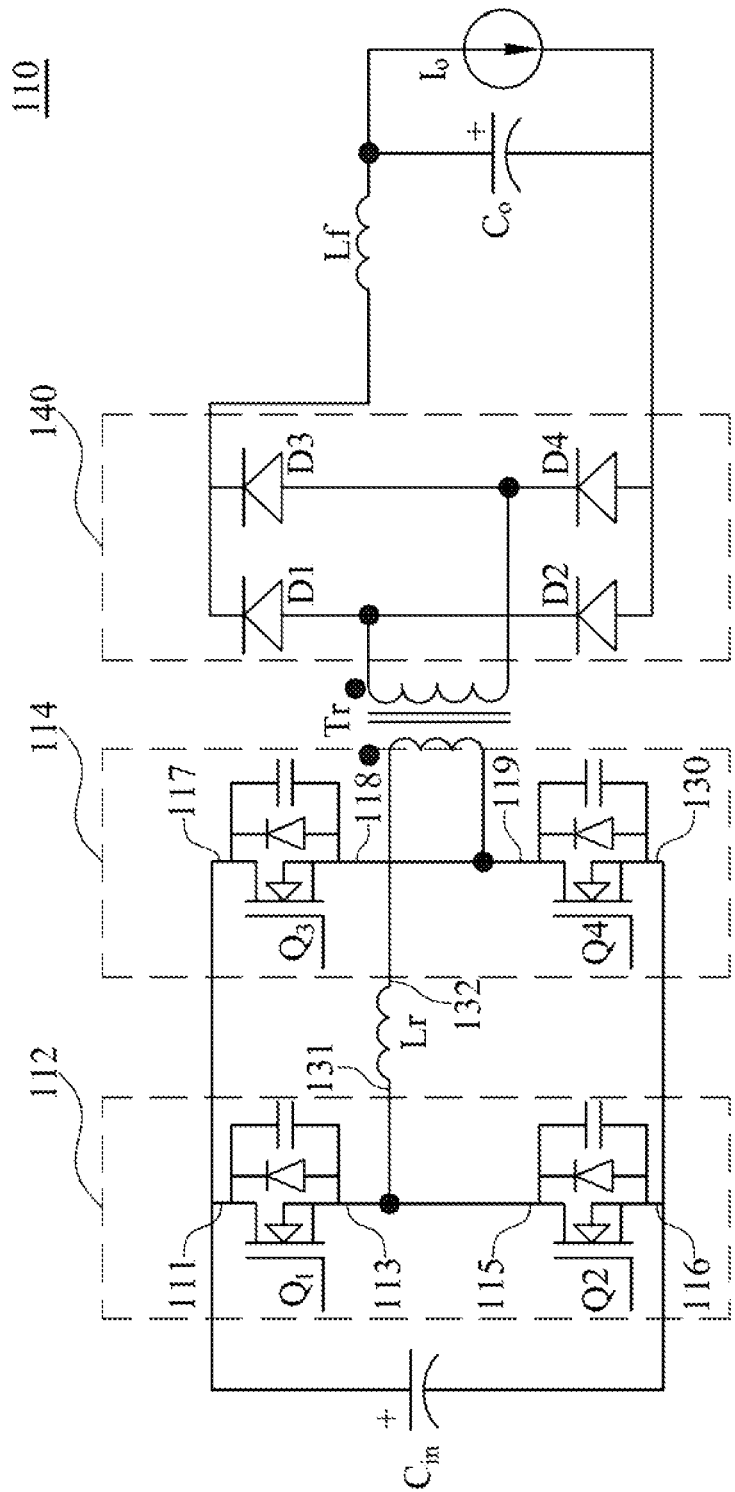
FIG. 2 is a diagram illustrating the a DC-DC conversion module according to FIG. 1 of the present invention.

FIG. 2 is a schematic diagram illustrating the DC-DC conversion module of FIG. 1 of the present invention. As illustrated, the DC-DC conversion module 110 comprises a first bridge 112 and a second bridge 114. The first bridge 112 is in parallel connection with the second bridge 114. The first bridge 112 comprises a first switch Q1 and a second switch Q2. The second bridge 114 comprises a third switch Q3 and a fourth switch Q4. The first switch Q1 comprises a first end 111 and a second end 113, the second switch Q2 comprises a first end 115 and a second end 116, the third switch Q3 comprises a first end 117 and a second end 118, and the fourth switch Q4 comprises a first end 119 and a second end 130. Structurally, the first end 115 of the second switch Q2 is in series connection with the second end 113 of the first switch Q1, and the first end 119 of the fourth switch Q4 is in series connection with the second end 118 of the third switch Q3. Further, the first end 117 of the third switch Q3 is electrically connected to the first end 111 of the first switch Q1, whereas the second end 130 of the fourth switch Q4 is electrically connected to the second end 116 of the second switch Q2.

In one embodiment, the DC-DC conversion module 110 further comprises a resonant inductor Lr, a transformer Tr, a secondary rectifying circuit 140 and an output inductor Lf. Said resonant inductor Lr could be, but is not limited to the leakage inductance of the transformer, or an additionally incorporated resonant inductor, wherein the resonant inductor Lr has a first end 131 and a second end 132, and the first end 131 of the resonant inductor Lr is electrically connected to the second end 113 of the first switch Q1. The transformer Tr has a primary winding and a secondary winding, wherein one end of the primary winding is electrically connected to the second end 132 of the resonant inductor Lr, and the other end of the primary winding is electrically connected to the second end 118 of the third switch Q3. The secondary winding is electrically connected to the secondary rectifying circuit 140. The secondary rectifying circuit 140 comprises rectifying diodes D1-D4, and the secondary rectifying circuit 140 could be, but is not limited to a full bridge rectifier and a center-tapped rectifier.

Figure 3:
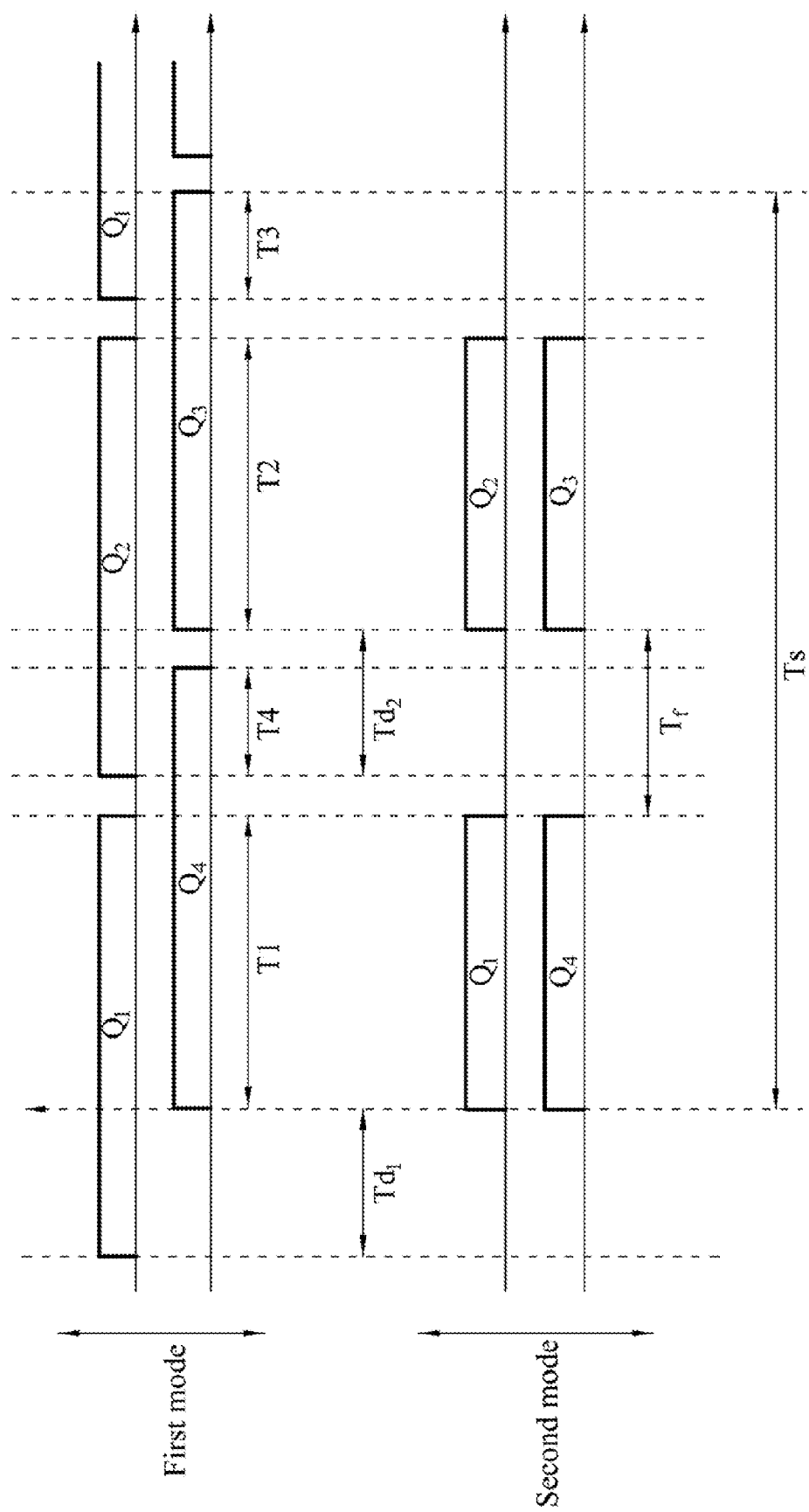
FIG. 3 schematically depicts the operation waveform of a DC-DC conversion module according to one embodiment of the present invention.

In operation, please refer to both FIG. 2 and FIG. 3, in which FIG. 3 illustrates the operation waveform of a DC-DC conversion module according to one embodiment of the present invention. As illustrated, the DC-DC conversion module 110 may be operated in a first mode and a second mode, and the DC-DC conversion module 110 could switch between the first mode and the second mode based on said detection signal. According to one embodiment of the present invention, as illustrated in FIG. 3, when the DC-DC conversion module 110 is operated in the first mode, there is a time delay Td1 between the respective turn-on times of the first switch Q1 and the fourth switch Q4, and there is a time delay Td2 between the respective turn-on times of the second switch Q2 and the third switch Q3; whereas when the DC-DC converter is operated in the second mode, the respective turn-on times of the first switch Q1 and the fourth switch Q4 are substantially the same, and the respective turn-on times of the second switch Q2 and the third switch Q3 are substantially the same.

Figure 4:
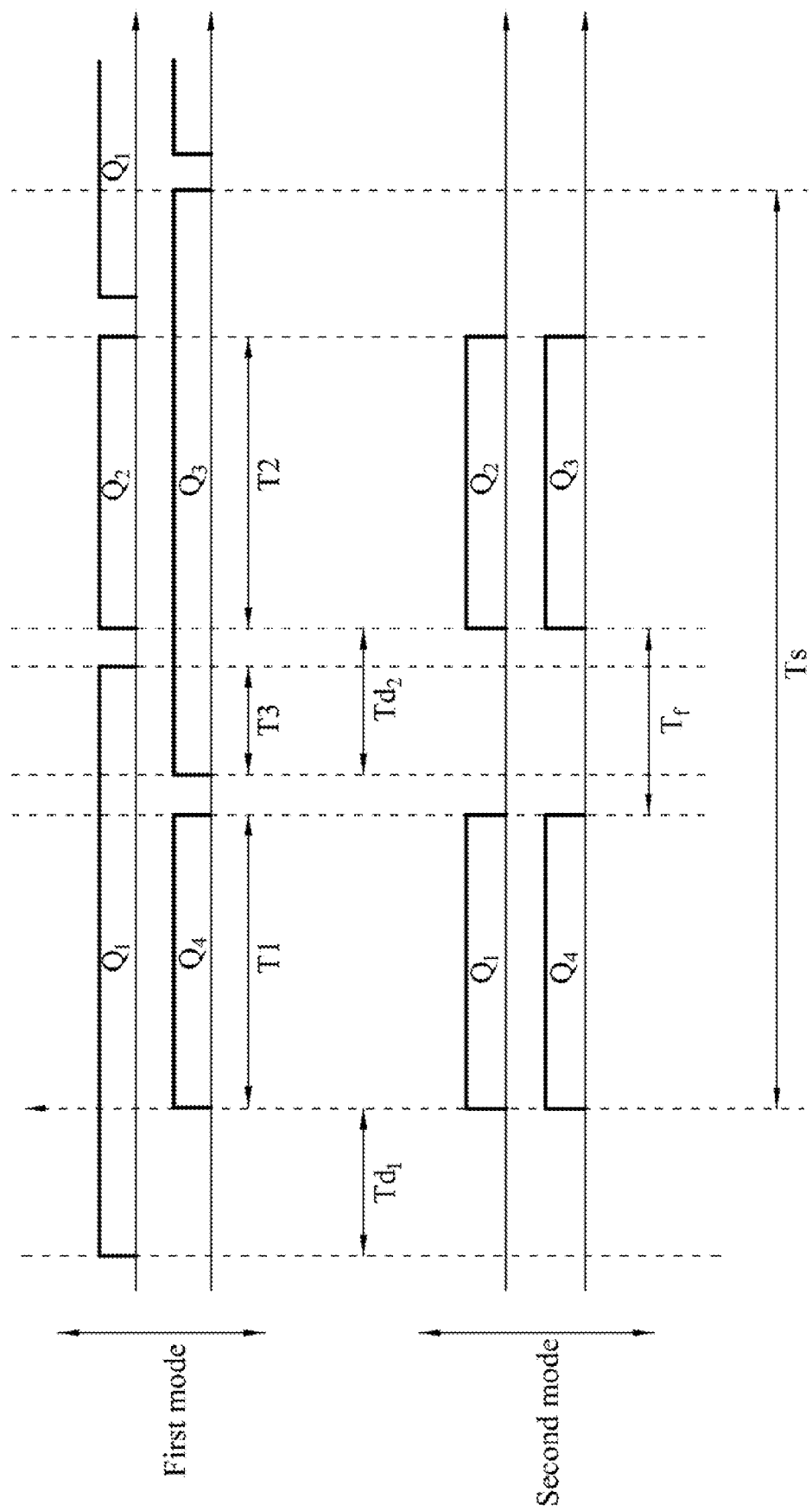
FIG. 4 schematically depicts the operation waveform of a DC-DC conversion module according to another embodiment of the present invention.

Moreover, please refer to both FIG. 2 and FIG. 4, in which FIG. 4 illustrates the operation waveform of a DC-DC conversion module according to another embodiment of the present invention. As illustrated, the DC-DC conversion module 110 could be operated in a first mode and a second mode, and the DC-DC conversion module 110 could switch between the first mode and the second mode based on said detection signal. According to one embodiment of the present invention, as illustrated in FIG. 4, when the DC-DC conversion module 110 is operated in the first mode, there is a time delay Td1 between the respective turn-on times of the first switch Q1 and the fourth switch Q4, and there is a time delay Td2 between the respective turn-on times of the second switch Q2 and the third switch Q3; whereas when the DC-DC converter is operated in the second mode, the respective turn-on times of the first switch Q1 and the fourth switch Q4 are substantially the same, and the respective turn-on times of the second switch Q2 and the third switch Q3 are substantially the same.

In this case, when the DC-DC conversion module 110 receives a control signal corresponding to the detection signal, it would switch the DC-DC conversion module 110 from a first mode to a second mode, or from a second mode to a first mode. Specifically, when the DC-DC conversion module 110 is switched from a first mode to a second mode, the problem associated with the substantial decrease of the efficiency of the full bridge zero-voltage switch converter under low-voltage output is ameliorated; and when the DC-DC conversion module 110 is switched from a second mode to a first mode, the problem associated with the low efficiency of the hard full bridge converter under high-voltage output is ameliorated such that the full bridge zero-voltage switch converter is operated in the phase-shifted full bridge converter mode or the complementary full bridge converter mode.

However, the present invention is not limited thereto, and those perceived by persons having ordinary skill in the art in light of the context and spirits of the present disclosure are within the scope of the present invention.

In one embodiment of the present invention, all of the first switch Q1, the second switch Q2, the third switch Q3 and the fourth switch Q4 are metal oxide semiconductor field effect transistors (MOSFET) or insulated gate bipolar transistors (IGBT). However, the present invention is not limited thereto. Persons having ordinary skills in the art would select suitable electronic elements to embody said switches depending on actual needs.

In another embodiment of the present invention, as illustrated in FIG. 3, when the DC-DC conversion module 110 is operated in a first mode, the turn-on periods of the first switch Q1 and the third switch Q3 has a first overlapping time T3, and the turn-on periods of the second switch Q2 and the forth switch Q4 has a second overlapping time T4; whereas when the DC-DC conversion module 110 is operated in a second mode, a turn-on period of the first switch and a turn-on period of the third switch are not overlapped, and a turn-on period of the second switch and a turn-on period of the fourth switch are not overlapped. That is, when the DC-DC conversion module 110 is operated in the second mode, there is no loop-current therein, thereby reducing the conduction loss and improving the conversion efficiency.

In still another embodiment of the present invention, as illustrated in FIG. 4, when the DC-DC conversion module 110 is operated in a first mode, the turn-on periods of the first switch Q1 and the third switch Q3 has a first overlapping time T3, and the turn-on periods of the second switch Q2 and the forth switch Q4 are not overlapped; whereas when the DC-DC conversion module 110 is operated in a second mode, a turn-on period of the first switch Q1 and a turn-on period of the third switch Q3 are not overlapped, and a turn-on period of the second switch Q2 and a turn-on period of the fourth switch Q4 are not overlapped. Similarly, when the DC-DC conversion module 110 is operated in a second mode, there is no loop-current therein, thereby reducing the conduction loss and improving the conversion efficiency.

In yet another embodiment of the present invention, as illustrated in FIG. 3 and FIG. 4, when the DC-DC conversion module 110 is operated in a first mode, there is a first overlapping time T1 between the turn-on period of the first switch Q1 and the turn-on period of the forth switch Q4, and there is a second overlapping time T2 between the turn-on period of the second switch Q2 and the turn-on period of the third switch Q3. In yet still another embodiment of the present invention, the duty ratio is defined as the ratio of the sum of the first overlapping time T1 and the second overlapping time T2 to the operating cycle Ts of the DC-DC conversion module 110. That is, the duty ratio of the DC-DC conversion module 110 is (T1+T2)/Ts, where Ts is a period between the turn-on time of the first switch and the turn-off time of the second switch. When the duty ratio of the DC-DC conversion module 110 is greater than a first duty ratio threshold value, the DC-DC conversion module 110 is operated in a first mode; whereas when the duty ratio of the DC-DC conversion module 110 is less than a second duty ratio threshold value, the DC-DC conversion module 110 is operated in a second mode. In one embodiment, the first duty ratio threshold value and the second duty ratio threshold value are both 70%. In other embodiments, the first duty ratio threshold value is different from the second duty ratio threshold value.

In yet another embodiment of the present invention, when the output voltage of the DC-DC conversion module 110 is greater than a first pre-set threshold value, the DC-DC conversion module 110 is operated in the first mode; and when the output voltage of the DC-DC conversion module 110 is less than a second pre-set threshold value, the DC-DC conversion module 110 is operated in the second mode. In one embodiment, the first pre-set threshold value is no less than the second pre-set threshold value.

In still another embodiment of the present invention, as illustrated in FIG. 3 and FIG. 4, when the DC-DC conversion module 110 is operated in a second mode, there is an idle time Tf between the turn-on period of the first switch Q1 and the turn-on period of the third switch Q3, and there is an idle time Tf between the turn-on period of the second switch Q2 and the turn-on period of the forth switch Q4.

In yet another embodiment of the present invention, the DC-DC converter 100 further comprises a control module 120. The control module 120 is configured to generate a control signal based on the efficiency, duty ratio, output current or output voltage of the DC-DC conversion module 110.

In yet another embodiment of the present invention, the DC-DC converter 100 further comprises a control module 120. The control module 120 is configured to look-up in a look-up table based on the efficiency of the DC-DC conversion module 110, thereby generating a control signal. The look-up table may contain data regarding the better control mode(s) under various efficiencies based on experimental results. In this way, it is possible to look-up in the table based on the current status so that the DC-DC converter 100 could achieve the optimal efficiency. In one embodiment, the look-up table reflects the relationship between the efficiency of the DC-DC converter in a first mode and the efficiency of the DC-DC converter in a second mode, under different output voltages and output currents. In other words, under different output voltages and different output currents, the respective efficiencies of the phase-shifted full bridge (or complementary full bridge) and the hard switch full bridge are compared one by one, and the operation mode of the DC-DC conversion module 110 is selected based on the efficiency.

In yet another embodiment of the present invention, the DC-DC converter 100 further comprises a control module 120. When the efficiency of the DC-DC conversion module 110 operated in a first mode is greater than the efficiency of the DC-DC conversion module 110 operated in a second mode, the control module 120 generate a control signal, such that the DC-DC converter 100 is operated in a first mode; vice versa.

In yet another embodiment of the present invention, when the DC-DC conversion module 110 is operated in a first mode, the turn-on period of the forth switch Q4 and the turn-on period of the second switch Q2 have a loop-current overlapping time, and during the loop-current overlapping time, the fourth switch Q4, the resonant inductor Lr, the primary winding of the transformer Tr and the second switch Q2 form an internal loop-current loop. Similarly, the turn-on period of the first switch Q1 and the turn-on period of the third switch Q3 also have a loop-current overlapping time, and during the loop-current overlapping time, the first switch Q1, the resonant inductor Lr, the primary winding of the transformer Tr and the third switch Q3 form an internal loop-current loop.

Figure 5:
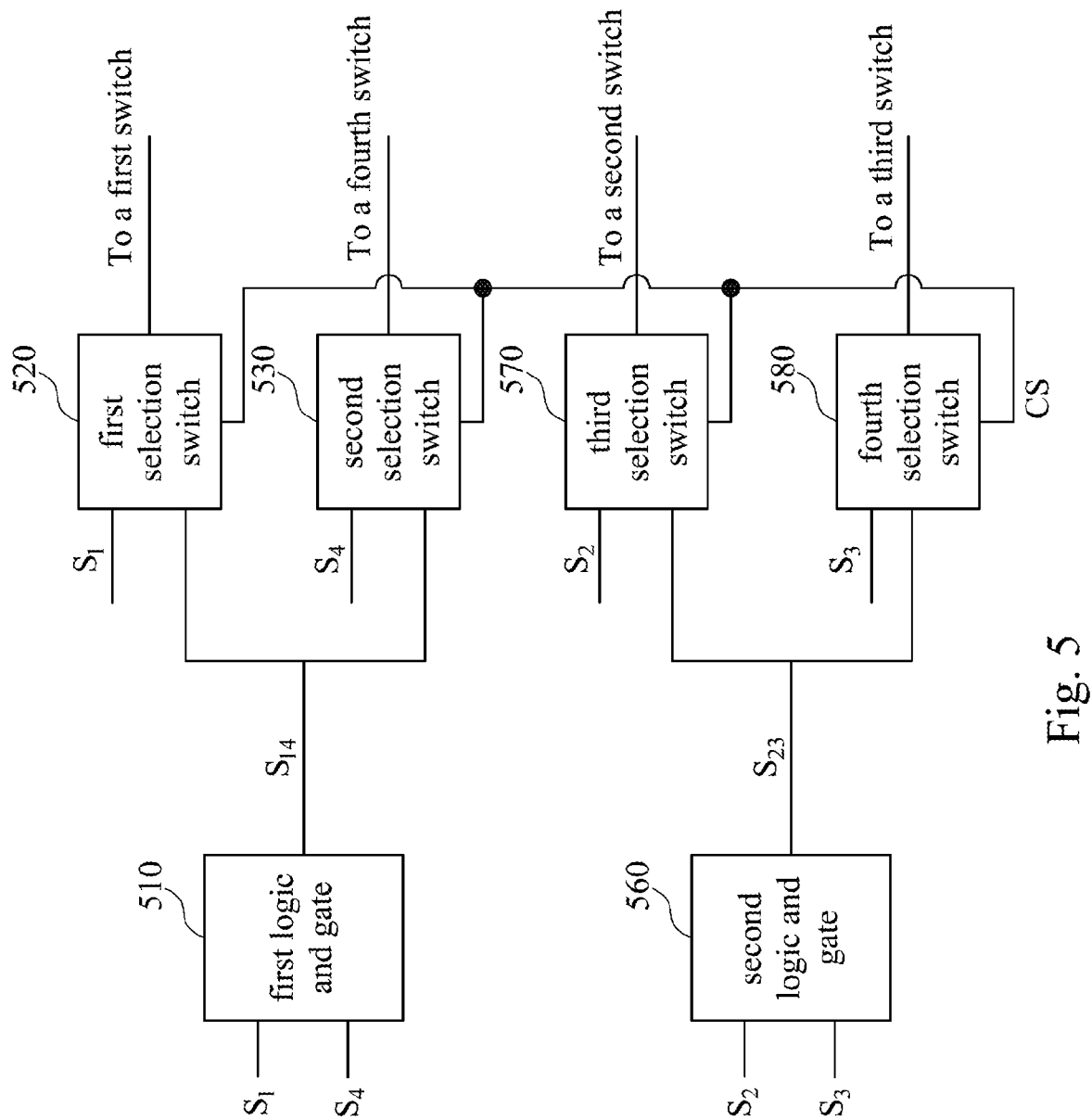
FIG. 5 is a circuit block diagram illustrating a control module according to yet another embodiment of the present invention.

FIG. 5 illustrates the circuit block diagram of a control module according to another embodiment of the present invention. In one embodiment of the present invention, the DC-DC converter 100 further comprises a control module 120. In this example, a first driving signal S1, a second driving signal S2, a third driving signal S3 and a fourth driving signal S4 respectively correspond to a first switch Q1, a second switch Q2, a third switch Q3 and a fourth switch Q4. The control module 120 comprises a first logic and gate 510, a first to selection switch 520, a second selection switch 530, a second logic and gate 560, a third selection switch 570 and a fourth selection switch 580.

In operation, when the DC-DC conversion module 110 is switched from a first mode to a second mode, a first control signal is generated by the logic and operation of the first driving signal S1 of the first switch and the fourth driving signal S4 of the fourth switch Q4, so as to control the first switch Q1 and the fourth switch Q4; and a second control signal is generated by the logic and operation of the second driving signal S2 of the second switch Q2 and the third driving signal S3 of the third switch Q3, so as to control the second switch Q2 and the third switch Q3.

In one embodiment, the first logic and gate 510 is configured to receive the first driving signal S1 corresponding to the first switch Q1 and the fourth driving signal S4 corresponding to the fourth switch Q4, and output a first synchronization signal S14. The first selection switch 520 is configured to receive the first driving signal S1 and the first synchronization signal S14, and determine whether to output the first driving signal S1 or the first synchronization signal S14 to the first switch Q1 based on the switch signal CS. In addition, the second selection switch 530 is configured to receive the fourth driving signal S4 and the first synchronization signal S14, and determine whether to output the fourth driving signal S4 or the first synchronization signal S14 to the fourth switch Q4 based on the switch signal CS.

The second logic and gate 560 is configured to receive the second driving signal S2 corresponding to the second switch Q2 and the third driving signal S3 corresponding to the third switch Q3, and output a second synchronization signal S23. The third selection switch 530 is configured to receive the second driving signal S2 and the second synchronization signal S23, and determine whether to output the second driving signal S2 or the second synchronization signal S23 to the second switch Q2 based on the switch signal CS. The fourth selection switch 580 is configured to receive the third driving signal S3 and the second synchronization signal S23, and determine whether to output the third driving signal S3 or the second synchronization signal S23 to the third switch Q3 based on the switch signal CS.

In another embodiment, the DC-DC conversion module 110 is operated in the first mode, and the first, second, third and fourth selection switches 520, 530, 570, 580 respectively output the first, second, third and fourth driving signals S1-S4 to the first, second, third and fourth switches Q1-Q4. That is, the first selection switch 520 and the second selection switch 530 respectively select to output the first driving signal S1 and the fourth driving signal S4, rather than selecting the first synchronization signal S14; and the third selection switch 570 and the fourth selection switch 580 respectively select to output the second driving signal S2 and the third driving signal S3, rather than selecting the second synchronization signal S23.

In yet another embodiment, the DC-DC conversion module 110 is operated in a second mode, and the first and the second selection switches 520, 530 output the first synchronization signal S14 to the first switch Q1 and the fourth switch Q4; whereas the third and the fourth selection switches 570, 580 output the second synchronization signal S23 to the second switch Q2 and the third switch Q3.

Figure 6:
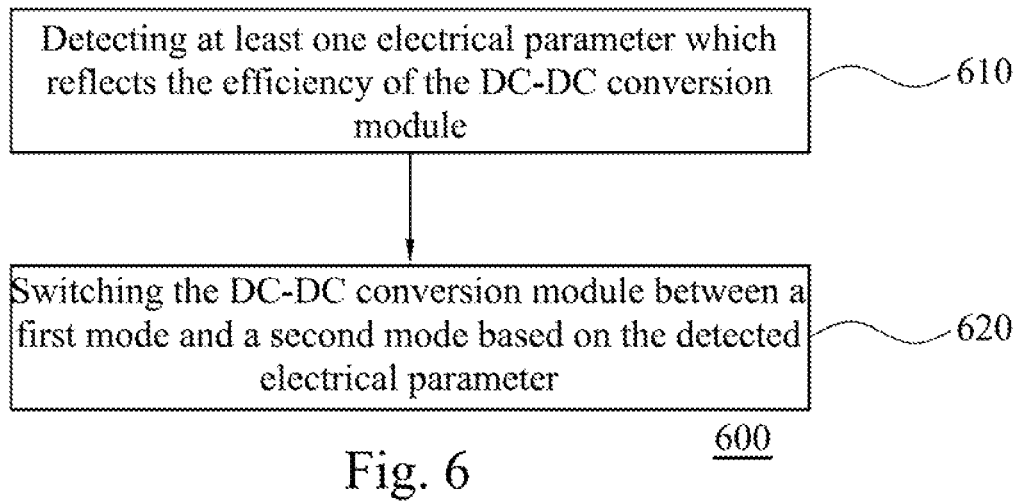
FIG. 6 is a flow diagram schematically illustrating the method for controlling a DC-DC conversion module according to still another embodiment of the present invention.

FIG. 6 is a flow diagram illustrating a method for controlling a DC-DC conversion module according to another embodiment of the present invention. The structure of the DC-DC conversion module is described hereinabove in connection with FIG. 2, and hence, detailed description thereof is omitted herein. In operation, the DC-DC conversion module is operated in a first mode and a second mode. In this example, the control method 600 of the DC-DC conversion module comprises the following steps:

Step 610: detecting at least one electrical parameter which reflects the efficiency of the DC-DC conversion module; and Step 620: switching the DC-DC conversion module between a first mode and a second mode based on the detected electrical parameter.

For the purpose of illustration, the following control method is discussed with reference to FIG. 2 and FIG. 6, which are used as an example, and the present invention is not limited thereto. Please refer to FIG. 2 and FIG. 6. In step 610, the control module 120 is used to detect the electrical parameter capable of reflecting the efficiency of the DC-DC converter 100. Next, in step 620, the control module 120 switches the DC-DC conversion module 110 between a first mode and a second mode based on the detected electrical parameter.

In this way, the control method 600 of the DC-DC converter could switch the DC-DC conversion module 110 from a first mode to a second mode, or from a second mode to a first mode, based on the detection signal. Hence, the problem associated with the substantial decrease of the efficiency of the full bridge zero-voltage switch converter under low-voltage output is ameliorated. Also, under high-voltage output, the full bridge zero-voltage switch converter is maintained in the phase-shifted full bridge converter mode or the complementary full bridge converter mode. However, the present invention is not limited thereto, and those perceived by persons having ordinary skill in the art in light of the context and spirits of the present disclosure are within the scope of the present invention.

In one embodiment of the present invention, the electrical parameter is the duty ratio, output current or output voltage of the DC-DC converter.

Figure 7:
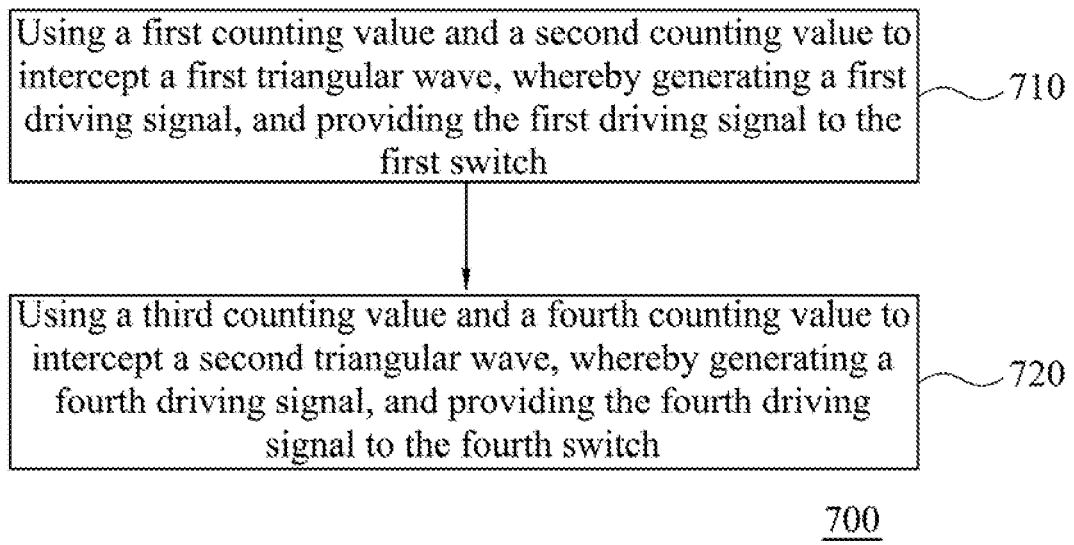
FIG. 7 is a flow diagram schematically illustrating the method for controlling a DC-DC conversion module according to yet another embodiment of the present invention.

FIG. 7 is a flow diagram illustrating a method for controlling a DC-DC conversion module according to yet another embodiment of the present invention. The control method 700 of the DC-DC conversion module comprises the following steps:

Step 710: using a first counting value and a second counting value to intercept a first triangular wave, whereby generating a first driving signal, and providing the first driving signal to the first switch; and Step 720: using a third counting value and a fourth counting value to intercept a second triangular wave, whereby generating a fourth driving signal, and providing the fourth driving signal to the fourth switch.

Figure 8:
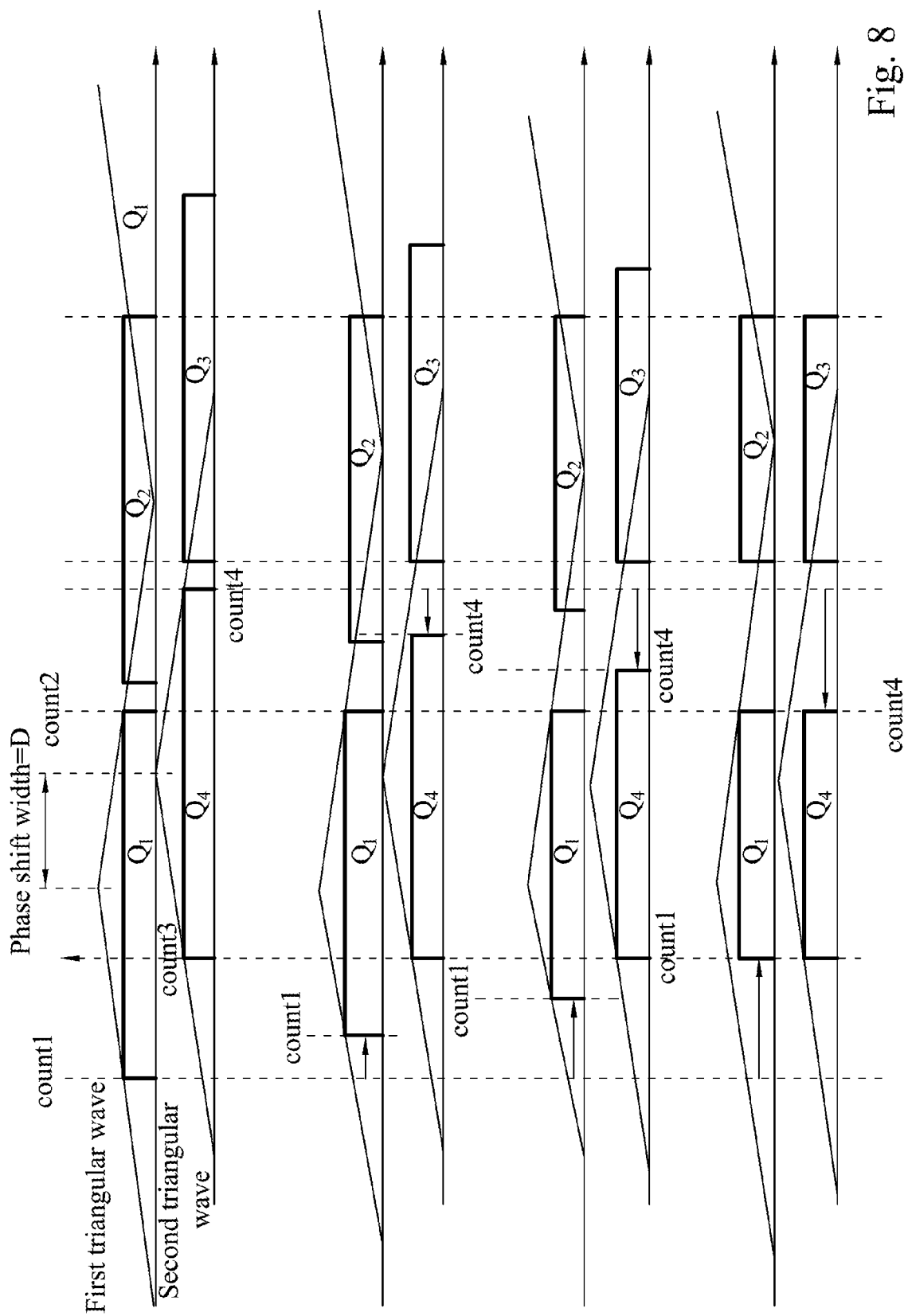
FIG. 8 schematically depicts the operation waveform of a DC-DC conversion module according to one embodiment of the present invention.

For the purpose of illustration, the above control method is discussed with reference to FIG. 7 and FIG. 8, which are used as an example, and the present invention is not limited thereto. FIG. 8 schematically depicts the operation waveform of a DC-DC conversion module according to one embodiment of the present invention. As illustrated in FIG. 8, a first counting value count1 and a second counting value count2 are used to intercept a first triangular wave, whereby generating a first driving signal, and provide the first driving signal to the first switch Q1; whereas a third counting value count3 and a fourth counting value count4 are used to intercept a second triangular wave, whereby generating a fourth driving signal, and provide the fourth driving signal to the fourth switch Q4. In one embodiment, the first triangular wave and the second triangular wave are isosceles right triangular wave. More specifically, when the enable mode is switched, the first counting value count1 is gradually adjusted, and the first triangular wave is used to regulate the start time of the first driving signal; and the fourth counting value count4 is gradually adjusted, and the second triangular wave is used to regulate the stop time of the fourth driving signal. In one embodiment, the adjusted first counting value count1 is equal to the third counting value count3, and the adjusted fourth counting value count4 is equal to the second counting value count2. In this example, since the first counting value count1 and the fourth counting value count4 are gradually adjusted, the corresponding first driving signal and fourth driving signal are also gradually adjusted, thereby avoiding the abrupt alteration of the waveform and increasing the stability of the DC-DC conversion module 110.

Please refer to FIG. 8, in one embodiment of the present invention, the uppermost block is the initial status. Since the DC-DC conversion module 110 could be a phase-shifted full bridge converter, in the initial status, the first triangular wave and the second triangular wave have a phase shift width D therebetween.

Figure 9:
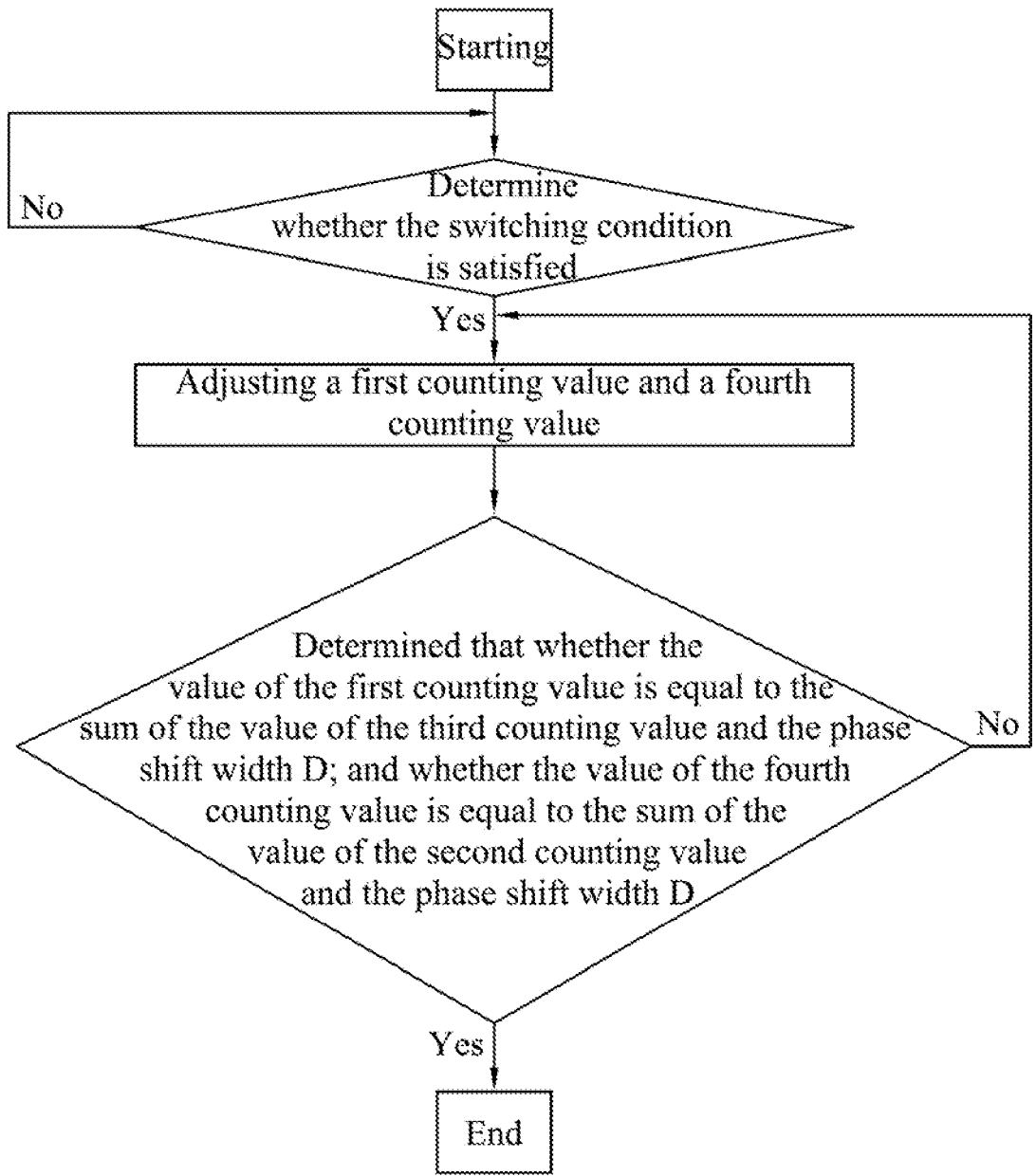
FIG. 9 is a flow diagram schematically illustrating the method for controlling a DC-DC converter according to yet another embodiment of the present invention.

FIG. 9 schematically depicts the operation waveform of a DC-DC conversion module according to another embodiment of the present invention. Please refer to both FIG. 8 and FIG. 9. In one embodiment of the present invention, firstly, a determination is made to determine whether the switching condition is satisfied. When the switching condition is not satisfied, the determination step is repeated, and when the switching condition is satisfied, the first counting value count1 is adjusted such that the value of the first counting value count1 gradually increases to the value of the third counting value count3. Meanwhile, the fourth counting value count4 is adjusted such that the value of the fourth counting value count4 gradually increases to the value of the second counting value count2.

Next, it is determined that whether the value of the first counting value to count1 is equal to the sum of the value of the third counting value count3 and the phase shift width D; and whether the value of the fourth counting value count4 is equal to the sum of the value of the second counting value count2 and the phase shift width D. If the above-mentioned condition is not satisfied, the adjusting step of the first counting value count1 and the fourth counting value count4 is repeated; and if the above-mentioned condition is satisfied, the switch is completed.

Figure 10:
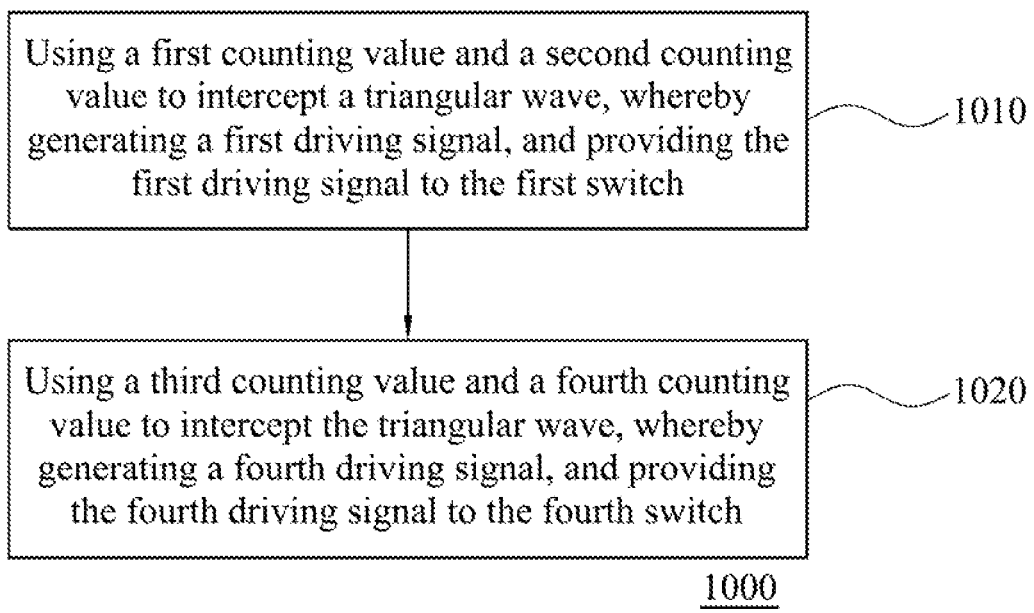
FIG. 10 is a flow diagram schematically illustrating the method for controlling a DC-DC conversion module according to still another embodiment of the present invention.

FIG. 10 is a flow diagram illustrating a method for controlling a DC-DC conversion module according to still another embodiment of the present invention. The control method 1000 of the DC-DC conversion module comprises the following steps:

Step 1010: using a first counting value and a second counting value to intercept a triangular wave, whereby generating a first driving signal, and providing the first driving signal to the first switch; and Step 1020: using a third counting value and a fourth counting value to intercept the triangular wave, whereby generating a fourth driving signal, and providing the fourth driving signal to the fourth switch.

Figure 11:
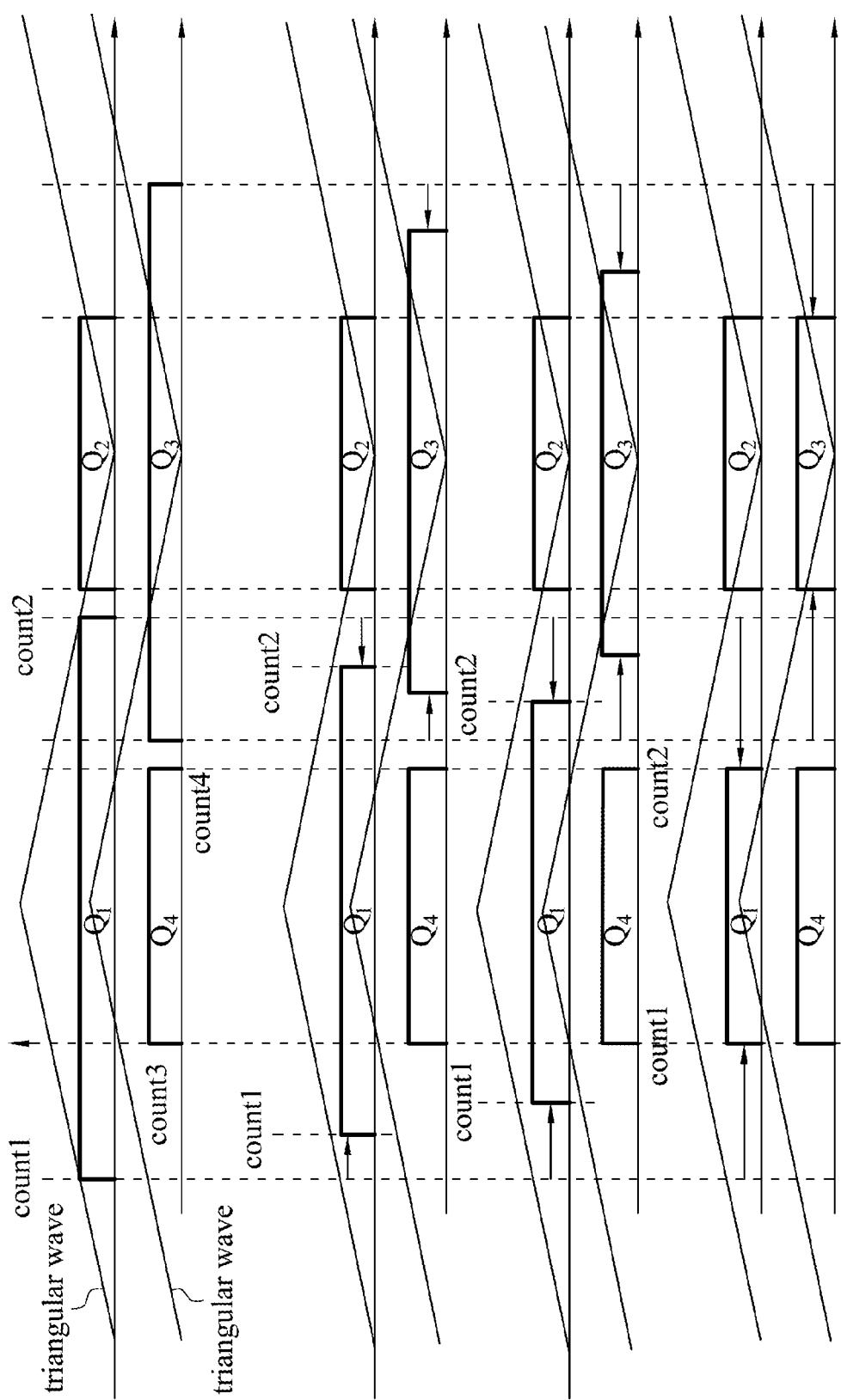
FIG. 11 schematically depicts the operation waveform of a DC-DC conversion module according to one embodiment of the present invention.

For the purpose of illustration, the above control method is discussed with reference to FIG. 10 and FIG. 11, which are used as an example, and the present invention is not limited thereto. FIG. 11 schematically depicts the operation waveform of a DC-DC conversion module according to one embodiment of the present invention. As illustrated in FIG. 11, a first counting value count1 and a second counting value count2 are used to intercept a triangular wave, whereby generating a first driving signal, and provide the first driving signal to the first switch Q1; whereas a third counting value count3 and a fourth counting value count4 are used to intercept said triangular wave, whereby generating a fourth driving signal, and provide the fourth driving signal to the fourth switch Q4. More specifically, when the enable mode is switched, the first counting value count1 is gradually adjusted, and the triangular wave is used to regulate the start time of the first driving signal; and the second counting value count2 is gradually adjusted, and the triangular wave is used to regulate the stop time of the first driving signal. In one embodiment, the adjusted first counting value count1 is equal to the third counting value count3, and the adjusted second counting value count2 is equal to the fourth counting value count4. In this example, since the first counting value count1 and the second counting value count2 are gradually adjusted, the corresponding first driving signal and fourth driving signal are also gradually adjusted, thereby avoiding the abrupt alteration of the waveform and increasing the stability of the DC-DC conversion module 110.

Figure 12:
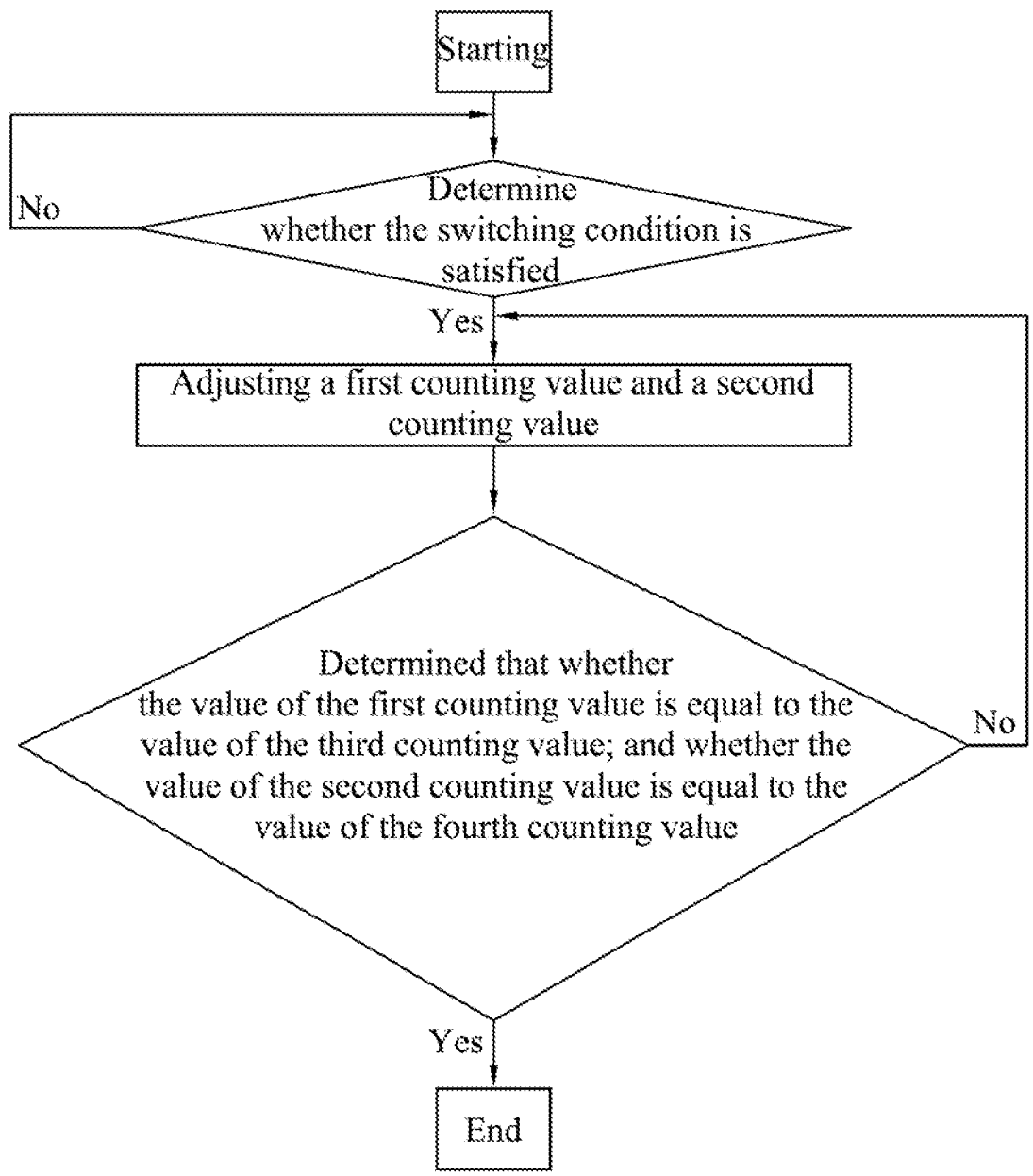
FIG. 12 is a flow diagram schematically illustrating the method for controlling a DC-DC converter according to still another embodiment of the present invention.

FIG. 12 is a flow diagram illustrating a method for controlling a DC-DC conversion module according to yet still another embodiment of the present invention. Please refer to both FIG. 11 and FIG. 12. In one embodiment of the present invention, firstly, a determination is made to determine whether the switching condition is satisfied. When the switching condition is not satisfied, the determination step is repeated, and when the switching condition is satisfied, the first counting value count1 is adjusted such that the value of the first counting value count1 gradually increases to the value of the third counting value count3. Meanwhile, the second counting value count2 is adjusted such that the value of the second counting value count2 gradually increases to the value of the fourth counting value count4.

Next, it is determined that whether the value of the first counting value count1 is equal to the value of the third counting value count3; and whether the value of the second counting value count2 is equal to the value of the fourth counting value count4. If the above-mentioned condition is not satisfied, the adjusting step of the first counting value count1 and the second counting value count2 is repeated; and if the above-mentioned condition is satisfied, the switch is completed.

Figure 13:
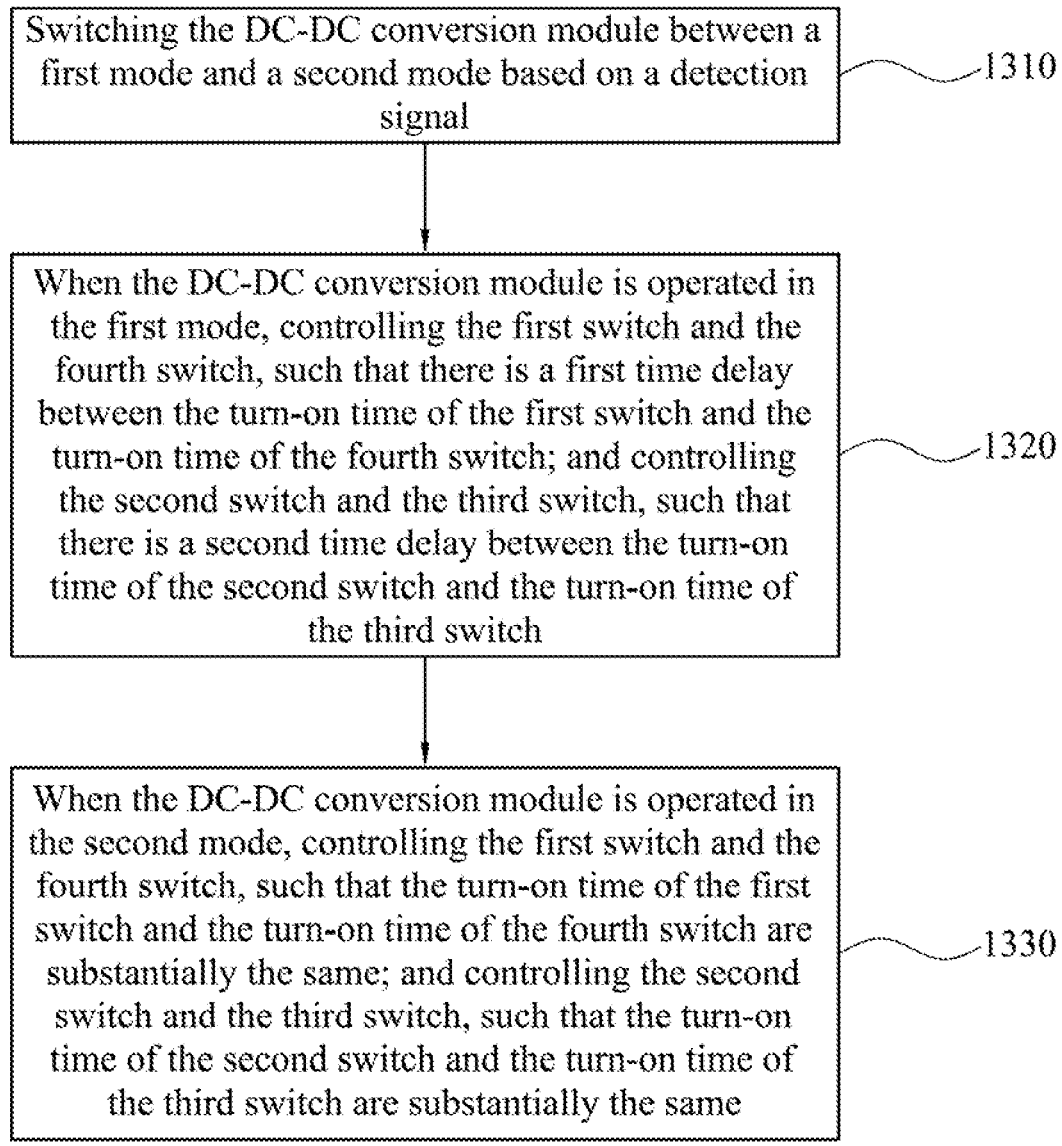
FIG. 13 is a flow diagram schematically illustrating the method for controlling a DC-DC converter according to still another embodiment of the present invention.

FIG. 13 is a flow diagram illustrating a method for controlling a DC-DC conversion module according to another embodiment of the present invention. The structure of the DC-DC conversion module is described hereinabove in connection with FIG. 2, and hence, detailed description thereof is omitted herein. In operation, the DC-DC conversion module is operated in a first mode and a second mode. In this example, the control method 1300 of the DC-DC conversion module comprises the following steps:

Step 1310: switching the DC-DC conversion module between a first mode and a second mode based on a detection signal;

Step 1320: when the DC-DC conversion module is operated in the first mode, controlling the first switch Q1 and the fourth switch Q4, such that there is a first time delay between the turn-on time of the first switch Q1 and the turn-on time of the fourth switch Q4; and controlling the second switch Q2 and the third switch Q3, such that there is a second time delay between the turn-on time of the second switch Q2 and the turn-on time of the third switch Q3; and Step 1330: when the DC-DC conversion module is operated in the second mode, controlling the first switch Q1 and the fourth switch Q4, such that the turn-on time of the first switch Q1 and the turn-on time of the fourth switch Q4 are substantially the same; and controlling the second switch Q2 and the third switch Q3, such that the turn-on time of the second switch Q2 and the turn-on time of the third switch Q3 are substantially the same.

For the purpose of illustration, the above control method is discussed with reference to FIG. 2 and FIG. 13, which are used as an example, and the present invention is not limited thereto. Please refer to both FIG. 2 and FIG. 13. In step 1310, the DC-DC conversion module 110 is used to switch the DC-DC conversion module 110 between the first mode and the second mode based on the detection signal.

Please refer to step 1320, when the DC-DC conversion module 110 is operated in the first mode, the control module 120 is used to control the first switch Q1 and the fourth switch Q4, such that there is a first time delay Td1 between the turn-on time of the first switch Q1 and the turn-on time of the fourth switch Q4, and control the second switch Q2 and the third switch Q3, such that there is a second time delay Td2 between the turn-on time of the second switch is Q2 and the turn-on time of the third switch Q3.

In step 1330, when the DC-DC conversion module 110 is operated in the second mode, the control module 120 is used to control the first switch Q1 and the fourth switch Q4, such that the turn-on time of the first switch Q1 and the turn-on time of the fourth switch Q4 are substantially the same; and control the second switch Q2 and the third switch Q3, such that the turn-on time of the second switch Q2 and the turn-on time of the third switch Q3 are substantially the same.

In this way, the control method 1300 for the DC-DC converter could switch the DC-DC conversion module 110 from the first mode to the second mode, or from the second mode to the first mode, based on the detection signal, so as to ameliorate the problem associated with the substantial decrease of the efficiency of the full bridge zero-voltage switch transformer under low-voltage output, as well as maintain the full bridge zero-voltage switch converter in the phase-shifted full bridge converter mode or the complementary full bridge converter mode, under high-voltage output.

In one embodiment of the present invention, please also refer to FIG. 3, when the DC-DC conversion module 110 is operated in the first mode, the control module 120 is used to control the first switch Q1 and the third switch Q3, such that there is a first overlapping time T3 between the turn-on period of the first switch Q1 and the turn-on period of the third switch Q3; and control the second switch Q2 and the fourth switch Q4, such that there is a second overlapping time T4 between the turn-on period of the second switch Q2 and the turn-on period of the forth switch Q4; whereas when the DC-DC conversion module 110 is operated in the second mode, the control module 120 is used to control the first switch Q1 and the third switch Q3, such that the turn-on period of the first switch Q1 and the turn-on period of the third switch Q3 are not overlapped; and control the second switch Q2 and the fourth switch Q4, such that the turn-on period of the second switch Q2 and the turn-on period of the forth switch Q4 are not overlapped.

In another embodiment of the present invention, please also refer to FIG. 4, when the DC-DC conversion module 110 is operated in the first mode, the control module 120 is used to control the first switch Q1 and the third switch Q3, such that there is a first overlapping time T3 between the turn-on period of the first switch Q1 and the turn-on period of the third switch Q3; and control the second switch Q2 and the fourth switch Q4, such that the turn-on period of the second switch Q2 and the turn-on period of the forth switch Q4 are not overlapped; whereas when the DC-DC conversion module 110 is operated in the second mode, the control module 120 is used to control the first switch Q1 and the third switch Q3, such that the turn-on period of the first switch Q1 and the turn-on period of the third switch Q3 are not overlapped; and control the second switch Q2 and the fourth switch Q4, such that the turn-on period of the second switch Q2 and the turn-on period of the forth switch Q4 are not overlapped.

In yet another embodiment of the present invention, please refer to both FIG. 3 and FIG. 4, when the DC-DC conversion module 110 is operated in the first mode, the control module 120 is used to control the first switch Q1 and the fourth switch Q4, such that there is a first overlapping time T1 between the turn-on period of the first switch Q1 and the turn-on period of the forth switch Q4, and control the second switch Q2 and the third switch Q3, such that there is a second overlapping time T2 between the turn-on period of the second switch Q2 and the turn-on period of the third switch Q3. In yet still another embodiment of the present invention, the ratio of the sum of the first overlapping time T1 and the second overlapping time T2 to the operating cycle Ts of the DC-DC conversion module 110 is defined as the duty ratio. When the DC-DC conversion module 110 is operated in the first mode, the duty ratio is greater than 70%, whereas when the DC-DC conversion module 110 is operated in the second mode, the duty ratio is less than 70%.

In yet another embodiment of the present invention, when the DC-DC conversion module 110 is operated in the second mode, the control module 120 is used to control the first switch Q1 and the third switch Q3, such that there is an idle time Tf between the turn-on period of the first switch Q1 and the turn-on period of the third switch Q3; and control the second switch Q2 and the fourth switch Q4, such that there is an idle time Tf between the turn-on period of the second switch Q2 and the turn-on period of the forth switch Q4.

Please refer to both FIG. 1 and FIG. 13. In said step, the control module 120 is used to generate a control signal based on the efficiency, duty ratio, output current or output voltage of the DC-DC conversion module 110. However, the present invention is not limited thereto, and those perceived by persons having ordinary skill in the art in light of the context and spirits of the present disclosure are within the scope of the present invention.

In yet another embodiment of the present invention, the control method 1300 for the DC-DC converter further comprises the following step: looking-up a table based on the efficiency of the DC-DC conversion module, whereby generating a control signal.

Please refer to both FIG. 1 and FIG. 13. In the above-identified step, the control module 120 is used to look-up a table based on the efficiency of the DC-DC conversion module 110, whereby generating the control signal. The look-up table may contain data regarding the better control mode(s) under various efficiencies based on experimental results. In this way, it is possible to look-up in the table based on the current status so that the DC-DC conversion module 110 could achieve the optimal efficiency.

In still another embodiment of the present invention, the control method 1300 for the DC-DC converter further comprises the following step: generating a control signal when the efficiency of the DC-DC converter in the first mode is greater than the efficiency of the DC-DC converter in the second mode.

Please refer to both FIG. 1 and FIG. 13. In above step, when the efficiency of the DC-DC conversion module 110 operated in the first mode is greater than the efficiency of the DC-DC conversion module 110 operated in the second mode, the control module 120 is used to generate a control signal, such that the DC-DC conversion module 110 is operated in the first mode. Similarly, when the efficiency of the DC-DC conversion module 110 operated in the second mode is greater than the efficiency of the DC-DC conversion module 110 operated in the first mode, the control module 120 is used to generate a control signal, such that DC-DC conversion module 110 is operated in the second mode.

Figure 14:
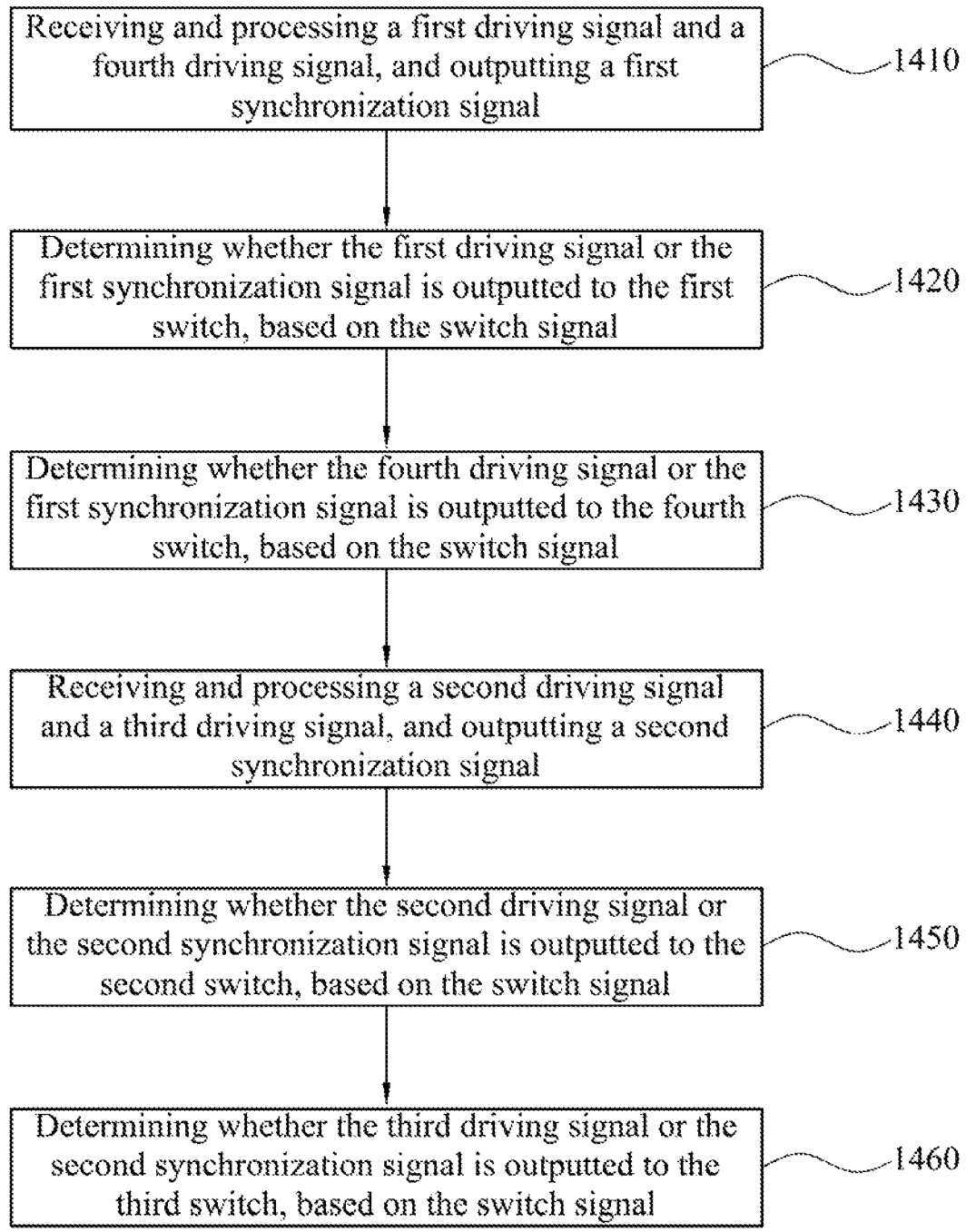
FIG. 14 is a flow diagram illustrating the detailed method for controlling the DC-DC converter of FIG. 13 of the present invention.

FIG. 14 is a flow diagram illustrating a control method for the DC-DC converter according to FIG. 6 of the present invention. The structure of the DC-DC conversion module described hereinabove is in connection with FIG. 2, and hence, detailed description thereof is omitted herein. In still another embodiment of the present invention, a first driving signal, a second driving signal, a third driving signal and a fourth driving signal are respectively corresponding to a first switch, a second switch, a third switch and a fourth switch, whereas the control method 1400 for the DC-DC converter further comprises the following steps:

Step 1410: receiving and processing a first driving signal and a fourth driving signal, and outputting a first synchronization signal;

Step 1420: determining whether the first driving signal or the first synchronization signal is outputted to the first switch, based on the switch signal;

Step 1430: determining whether the fourth driving signal or the first synchronization signal is outputted to the fourth switch, based on the switch signal;

Step 1440: receiving and processing a second driving signal and a third driving signal, and outputting a second synchronization signal;

Step 1450: determining whether the second driving signal or the second synchronization signal is outputted to the second switch, based on the switch signal; and Step 1460: determining whether the third driving signal or the second synchronization signal is outputted to the third switch, based on the switch signal.

Please refer to both FIG. 5 and FIG. 14. In one embodiment of the present invention, in step 1410, the first logic and gate 510 is used to receive and process the first driving signal S1 and the fourth driving signal S4, and output a first synchronization signal S14. In step 1420, the first selection switch 520 is used to receive the first driving signal S1 and the first synchronization signal S14, and determine whether the first driving signal S1 or the first synchronization signal S14 is outputted to the first switch Q1, based on the switch signal. In step 1430, the second selection switch 530 is used to receive the fourth driving signal S4 and the first synchronization signal S14, and determine whether the fourth driving signal S4 or the first synchronization signal S14 is outputted to the fourth switch Q4, based on the switch signal.

Further, in step 1440, the second logic and gate 560 is used to receive and process a second driving signal S2 and a third driving signal S3, and output a second synchronization signal S23. Please refer to step 1450, the third selection switch 570 is used to receive the second driving signal S2 and the second synchronization signal S23, and determine whether the second driving signal S2 or the second synchronization signal S23 is outputted to the second switch Q2, based on the switch signal. In step 1460, the fourth selection switch 580 is used to receive the third driving signal S3 and the second synchronization signal S23, and determine whether the third driving signal S3 or the second synchronization signal S23 is outputted to the third switch Q3, based on the switch signal.

Please refer to FIG. 3, in one embodiment of the present invention, the structure of the DC-DC conversion module described hereinabove is in connection with FIG. 2, and hence, detailed description thereof is omitted herein. In operation, the DC-DC conversion module 110 is operated in the first mode and the second mode. When the DC-DC conversion module 110 is operated in the first mode, there is a first overlapping time T3 between the turn-on period of the first switch Q1 and the turn-on period of the third switch Q3; and there is a second overlapping time T4 between the turn-on period of the second switch Q2 and the turn-on period of the forth switch Q4; whereas when the DC-DC conversion module 110 is operated in the second mode, there is an idle time Tf between the turn-on period of the first switch Q1 and the turn-on period of the third switch Q3, and there is an idle time Tf between the turn-on period of the second switch Q2 and the turn-on period of the forth switch Q4.

In addition, when the duty ratio of the DC-DC conversion module 110 is greater than 70%, the DC-DC conversion module 110 is operated in the first mode; and when the duty ratio of the DC-DC conversion module 110 is less than 70%, the DC-DC conversion module 110 is operated in the second mode.

In another embodiment of the present invention, when the DC-DC conversion module 110 is operated in the first mode, there is a third overlapping time T1 between the turn-on period of the first switch Q1 and the turn-on period of the forth switch Q4, and there is a fourth overlapping time T2 between the turn-on period of the second switch Q2 and the turn-on period of the third switch Q3; and the ratio of the sum of the third overlapping time T1 and the fourth overlapping time T2 to the operating cycle Ts of the DC-DC conversion module 110 is defined as the duty ratio.

FIG. 15 is a flow diagram illustrating a control method for the DC-DC converter according to still another embodiment of the present invention. The structure of the DC-DC conversion module described hereinabove is in connection with FIG. 2, and hence, detailed description thereof is omitted herein. In operation, the DC-DC converter is operated in the first mode and the second mode, and the control method for the DC-DC converter comprises the following steps:

Step 1510: when the DC-DC conversion module is operated in the first mode, controlling the first switch Q1 and the third switch Q3, such that there is a first overlapping time between the turn-on period of the first switch Q1 and the turn-on period of the third switch Q3; and controlling the second switch Q2 and the fourth switch Q4, such that there is a second overlapping time between the turn-on period of the second switch Q2 and the turn-on period of the forth switch Q4;

Step 1520: when the DC-DC conversion module is operated in the second mode, controlling the first switch Q1 and the third switch Q3, such that there is an idle time between the turn-on period of the first switch Q1 and the turn-on period of the third switch Q3; and controlling the second switch Q2 and the fourth switch Q4, such that there is an idle time between the turn-on period of the second switch Q2 and the turn-on period of the forth switch Q4;

Step 1530: when the duty ratio of the DC-DC conversion module is greater than 70%, controlling the DC-DC conversion module to operate in the first mode, and Step 1540: when the duty ratio of the DC-DC conversion module is less than 70%, controlling the DC-DC conversion module to operate in the second mode.

Please refer to both FIG. 3 and FIG. 15. In one embodiment of the present invention, in step 1510, when the DC-DC conversion module 110 is operated in the first mode, the control module 120 is used to control the first switch Q1 and the third switch Q3, such that there is a first overlapping time T3 between the turn-on period of the first switch Q1 and the turn-on period of the third switch; and control the second switch Q2 and the fourth switch Q4, such that there is a second overlapping time T4 between the turn-on period of the second switch Q2 and the turn-on period of the forth switch Q4.

In step 1520, when the DC-DC conversion module 110 is operated in the second mode, the control module 120 is used to control the first switch Q1 and the third switch Q3, such that there is an idle time between the turn-on period of the first switch Q1 and the turn-on period of the third switch Q3, and control the second switch Q2 and the fourth switch Q4, such that there is an idle time between the turn-on period of the second switch Q2 and the turn-on period of the forth switch Q4.

Please refer to step 1530, when the duty ratio of the DC-DC conversion module 110 is greater than 70%, the control module 120 is used to control the DC-DC conversion module 110 to operate in the first mode. In this way, when the output voltage is higher, a higher conversion efficiency is achieved by using phase-shifted full bridge converter technique or complementary full bridge converter technique. In step 1540, when the duty ratio of the DC-DC conversion module 110 is less than 70%, the control module 120 is used to control the DC-DC conversion module 110 to operate in the second mode. In this way, when the output voltage is lower, a higher conversion efficiency is achieved by using hard switch full bridge technique.

In another embodiment of the present invention another, please refer to FIG. 3 and FIG. 15. When the DC-DC conversion module 110 is operated in the first mode, there is a third overlapping time T1 between the turn-on periods of the first switch Q1 and the forth switch Q4, and there is a fourth overlapping time T2 between the turn-on periods of the second switch Q2 and the third switch Q3; and the ratio of the sum of the third overlapping time T1 and the fourth overlapping time T2 to the operating cycle Ts of the DC-DC converter is defined as the duty ratio.

Figure 16:
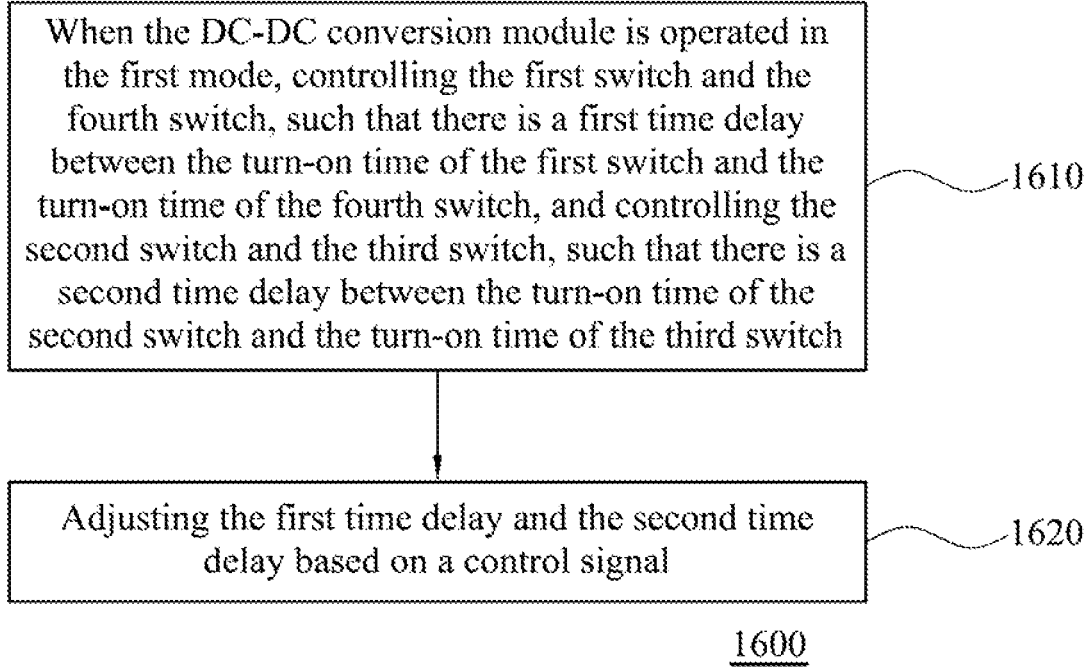
FIG. 16 is a flow diagram schematically illustrating the method for controlling a DC-DC converter according to still another embodiment of the present invention.

FIG. 16 is a flow diagram illustrating a control method for the DC-DC converter according to still another embodiment of the present invention. The structure of the DC-DC conversion module described hereinabove is in connection with FIG. 2, and hence, detailed description thereof is omitted herein. The control method 1600 for the DC-DC converter comprises the following steps:

Step 1610: when the DC-DC conversion module is operated in the first mode, controlling the first switch Q1 and the fourth switch Q4, such that there is a first time delay between the turn-on time of the first switch Q1 and the turn-on time of the fourth switch Q4, and controlling the second switch Q2 and the third switch Q3, such that there is a second time delay between the turn-on time of the second switch Q2 and the turn-on time of the third switch Q3; and Step 1620: adjusting the first time delay and the second time delay based on a control signal.

Please refer to both FIG. 3 and FIG. 16. In one embodiment of the present invention, in step 1610, when the DC-DC conversion module 110 is operated in the first mode, the control module 120 is used to control the first switch Q1 and the fourth switch Q4, such that there is a first time delay between the turn-on time of the first switch Q1 and the turn-on time of the fourth switch Q4; and control the second switch Q2 and the third switch Q3, such that there is a second time delay between the turn-on time of the second switch Q2 and the turn-on time of the third switch Q3.

Further, in step 1620, the DC-DC conversion module 110 could adjust the first time delay and the second time delay based on a control signal.

Those having skill in the art will appreciate that the control method for the DC-DC converter can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. It should be appreciated that none of the above-mentioned examples is inherently superior to the other, and they are not intended to limit the present invention. Those having ordinary skill in the art would flexibly select the suitable implementation depending on actual needs.

In addition, those skilled in the art will appreciate that each of the steps of the control method for the DC-DC converter named after the function thereof is merely used to describe the technology in the embodiment of the present invention in detail but not limited to. Therefore, combining the steps of said method into one step, dividing the steps into several steps, or rearranging the order of the steps are within the scope of the embodiment in the present invention.

In view of the foregoing embodiments of the present invention, many advantages of the present invention are now apparent. The embodiment of the present invention provides a DC-DC converter 100 and method for controlling the same, so as to ameliorate the problem associated with the substantial decrease of the efficiency of the full bridge zero-voltage switch converter under low-voltage output, as well as maintain the full bridge zero-voltage switch converter in the phase-shifted full bridge converter mode or the complementary full bridge converter mode, under high-voltage output.

In addition, in the DC-DC converter 100, by using the control method for the DC-DC converter, it is feasible to gradually adjust the driving signal provided the DC-DC converter 100, whereby avoiding the abrupt alteration of the waveform and increasing the stability of the DC-DC converter 100.

Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A direct current to direct current (DC-DC) converter, comprising:
   a first bridge, comprising:
      a first switch, having a first end and a second end; and
      a second switch, having a first end and a second end, wherein the first end of the second switch is in series connection with the second end of the first switch; and
   a second bridge, in parallel connection with the first bridge, comprising:
      a third switch, having a first end and a second end, wherein the first end of the third switch is electrically connected to the first end of the first switch; and
      a fourth switch, having a first end and a second end, wherein the first end of the fourth switch is in series connection with the second end of the third switch, and the second end of the fourth switch is electrically connected to the second end of the second switch,
   wherein the DC-DC converter is operated in a first mode or a second mode, and the DC-DC converter switches between the first mode and the second mode based on a duty ratio of the DC-DC converter,
   wherein a turn-on period of the first switch and a turn-on period of the fourth switch have a first overlapping time T1, and a turn-on period of the second switch and a turn-on period of the third switch have a second overlapping time T2, wherein the duty ratio of the DC-DC converter is (T1+T2)/Ts, where Ts is a period between the turn-on time of the first switch and the turn-off time of the second switch.

2. The DC-DC converter according to claim 1, wherein, when the DC-DC converter is operated in the first mode, there is a time delay between the respective turn-on times of the first switch and the fourth switch, and there is a time delay between the respective turn-on times of the second switch and the third switch; and
   when the DC-DC converter is operated in the second mode, the respective turn-on times of the first switch and the fourth switch are substantially the same, and the respective turn-on times of the second switch and the third switch are substantially the same.

3. The DC-DC converter according to claim 1, wherein the duty ratio of the DC-DC converter is configured to reflect the efficiency of the DC-DC converter.

4. The DC-DC converter according to claim 1, wherein, when the duty ratio of the DC-DC converter is greater than a first duty ratio threshold value, the DC-DC converter is operated in the first mode; and
   when the duty ratio of the DC-DC converter is less than a second duty ratio threshold value, the DC-DC converter is operated in the second mode.

5. The DC-DC converter according to claim 4, wherein the first duty ratio threshold value and the second duty ratio threshold value are both 70%.

6. The DC-DC converter according to claim 1, wherein when the DC-DC converter is switched from the first mode to the second mode,
   a first control signal is generated by a logic and operation between a first driving signal of the first switch and a fourth driving signal of the fourth switch, so as to control the first switch and the fourth switch; and
   a second control signal is generated by the logic and operation between a second driving signal of the second switch and a third driving signal of the third switch, so as to control the second switch and the third switch.

7. The DC-DC converter according to claim 1, wherein the DC-DC converter further comprising:
   a resonant inductor, having a first end and a second end, wherein the first end of the resonant inductor is electrically connected to the second end of the first switch; and
   a transformer, having a primary winding and a secondary winding, wherein one end of the primary winding is electrically connected to the second end of the resonant inductor, the other end of the primary winding is electrically connected to the second end of the third switch, and the secondary winding is electrically connected to a secondary rectifying circuit.

8. The DC-DC converter according to claim 7, wherein the secondary rectifying circuit is a full bridge rectifying circuit or a center-tapped rectifying circuit.

9. The DC-DC converter according to claim 7, wherein when the DC-DC converter is operated in the first mode, the turn-on period of the fourth switch and the turn-on period of the second switch have a loop-current overlapping time, wherein during the loop-current overlapping time, the fourth switch, the resonant inductor, the primary winding of the transformer and the second switch form an internal loop-current loop.

10. A method for controlling a DC-DC converter, the DC-DC converter comprising a first bridge and a second bridge that are in parallel connection, the first bridge comprising a first switch and a second switch that are in series connection, the second bridge comprising a third switch and a fourth switch that are in series connection, and the method comprising:
   detecting a duty ratio of the DC-DC converter which reflects the efficiency of the DC-DC converter; and switching the DC-DC converter between a first mode and a second mode based on the duty ratio of the DC-DC converter, wherein a turn-on period of the first switch and a turn-on period of the fourth switch have a first overlapping time T1, and a turn-on period of the second switch and a turn-on period of the third switch have a second overlapping time T2, wherein the duty ratio of the DC-DC converter is (T1+T2)/Ts, where Ts is a period between the turn-on time of the first switch and the turn-off time of the second switch.

11. The method according to claim 10, further comprising:
using a first counting value and a second counting value to intercept a first triangular wave, whereby generating a first driving signal, and providing the first driving signal to the first switch; and
using a third counting value and a fourth counting value to intercept a second triangular wave, whereby generating a fourth driving signal, and providing the fourth driving signal to the fourth switch, wherein the first triangular wave and the second triangular wave are isosceles right triangular waves, and the first triangular wave and the second triangular wave have a phase shift width therebetween.

12. The method according to claim 11, wherein when an enable mode is switched, the method further comprises:
gradually adjusting the first counting value, thereby regulating the start time of the first driving signal by the first triangular wave; and
gradually adjusting the fourth counting value, thereby regulating the stop time of the fourth driving signal by the second triangular wave,
wherein the adjusted first counting value is equal to the third counting value, and the adjusted fourth counting value is equal to the second counting value.

13. The method according to claim 10, further comprising:
using a first counting value and a second counting value to intercept a triangular wave, whereby generating a first driving signal, and providing the first driving signal to the first switch; and
using a third counting value and a fourth counting value to intercept the triangular wave, whereby generating a fourth driving signal, and providing the fourth driving signal to the fourth switch.

14. The method according to claim 13, wherein when enable mode is switched, the method further comprises:
gradually adjusting the first counting value, thereby regulating the start time of the first driving signal by the triangular wave; and
gradually adjusting the second counting value, thereby regulating the stop time of the first driving signal by the triangular wave,
wherein the adjusted first counting value is equal to the third counting value, and the adjusted fourth counting value is equal to the second counting value.

15. The method according to claim 10, wherein,
when the duty ratio of the DC-DC converter is greater than a first duty ratio threshold value, the DC-DC converter is operated in the first mode; and
when the duty ratio of the DC-DC converter is less than a second duty ratio threshold value, the DC-DC converter is operated in the second mode.

16. The method according to claim 15, wherein the first duty ratio threshold value and the second duty ratio threshold value are both 70%.

17. A DC-DC conversion system for optimizing the efficiency within a full output voltage range, the DC-DC conversion system comprising:
a DC-DC converter, comprising:
a first bridge, comprising:
a first switch, having a first end and a second end; and
a second switch, having a first end and a second end, wherein the first end of the second switch is in series connection with the second end of the first switch; and
a second bridge, in parallel connection with the first bridge, comprising:
a third switch, having a first end and a second end, wherein the first end of the third switch is electrically connected to the first end of the first switch; and
a fourth switch, having a first end and a second end, wherein the first end of the fourth switch is in series connection with the second end of the third switch, and the second end of the fourth switch is electrically connected to the second end of the second switch; and
a control circuit, comprising:
a signal generation unit, for receiving an electrical parameter which reflects the efficiency of the DC-DC converter, and outputting a corresponding switch signal; and
a control unit, for outputting a corresponding control signal to the DC-DC converter based on the switch signal, wherein the control unit further comprises:
a first logic and gate, for receiving a first driving signal corresponding to the first switch and a fourth driving signal corresponding to the fourth switch, and outputting a first synchronization signal;
a first selection switch, for receiving the first driving signal and the first synchronization signal, and outputting the first driving signal or the first synchronization signal to the first switch based on the switch signal;
a second selection switch, for receiving the fourth driving signal and the first synchronization signal, and outputting the fourth driving signal or the first synchronization signal to the fourth switch based on the switch signal;
a second logic and gate, for receiving a second driving signal corresponding to the second switch and a third driving signal corresponding to the third switch, and outputting a second synchronization signal;
a third selection switch, for receiving the second driving signal and the second synchronization signal, and outputting the second driving signal or the second synchronization signal to the second switch based on the switch signal; and
a fourth selection switch, for receiving the third driving signal and the second synchronization signal, and outputting the third driving signal or the second synchronization signal to the third switch based on the switch signal.

18. The DC-DC conversion system according to claim 17, wherein,
when the switch signal is a high-level voltage, the DC-DC converter is operated in a first mode; and
when the switch signal is a low-level voltage, the DC-DC converter is operated in a second mode.

19. The DC-DC conversion system according to claim 18, wherein,
when the DC-DC converter is operated in the first mode, there is a time delay between the respective turn-on times of the first switch and the fourth switch, and there is a time delay between the respective turn-on times of the second switch and the third switch; and when the DC-DC converter is operated in the second mode, the respective turn-on times of the first switch and the fourth switch are substantially the same, and the respective turn-on times of the second switch and the third switch are substantially the same.

20. The DC-DC conversion system according to claim 17, wherein when the DC-DC converter is operated in a first mode, the first, the second, the third and the fourth selection switches respectively output the first, the second, the third and the fourth driving signals to the first, the second, the third and the fourth switches.

21. The DC-DC conversion system according to claim 17, wherein when the DC-DC converter is operated in a second mode, the first and the second selection switches output the first synchronization signal to the first switch and the fourth switch, and the third and the fourth selection switches output the second synchronization signal to the second switch and the third switch.

22. The DC-DC conversion system according to claim 17, wherein the DC-DC converter further comprises:

a resonant inductor, having a first end and a second end, wherein the first end of the resonant inductor is electrically connected to the second end of the first switch; and a transformer, having a primary winding and a secondary winding, wherein one end of the primary winding is electrically connected to the second end of the resonant inductor, the other end of the primary winding is electrically connected to the second end of the third switch, and the secondary winding is electrically connected to a secondary rectifying circuit.

23. The DC-DC conversion system according to claim 22, wherein the secondary rectifying circuit is a full bridge rectifying circuit or a center-tapped rectifying circuit.

24. The DC-DC conversion system according to claim 22, wherein, when the DC-DC converter is operated in the first mode, the turn-on period of the fourth switch and the turn-on period of the second switch have a loop-current overlapping time, and during the loop-current overlapping time, the fourth switch, the resonant inductor, the primary winding of the transformer and the second switch form an internal loop-current loop.

\* \* \* \* \*